US011987485B2

(12) United States Patent
Tansey, Jr. et al.

(10) Patent No.: US 11,987,485 B2
(45) Date of Patent: May 21, 2024

(54) FLUID FILLING SYSTEMS AND METHODS

(71) Applicant: Fountain Master, LLC, Middletown, NJ (US)

(72) Inventors: Francis X. Tansey, Jr., Middletown, NJ (US); Gwenivere R. Tansey, Middletown, NJ (US)

(73) Assignee: Fountain Master, LLC, Middletown, NJ (US)

( * ) Notice: Subject to any disclaimer, the term of this patent is extended or adjusted under 35 U.S.C. 154(b) by 99 days.

(21) Appl. No.: 17/552,157

(22) Filed: Dec. 15, 2021

(65) Prior Publication Data

US 2022/0106177 A1 Apr. 7, 2022

Related U.S. Application Data

(63) Continuation of application No. 16/868,144, filed on May 6, 2020, now Pat. No. 11,208,310.

(60) Provisional application No. 62/843,912, filed on May 6, 2019.

(51) Int. Cl.
*B67C 3/10* (2006.01)
*B67C 3/26* (2006.01)

(52) U.S. Cl.
CPC .............. *B67C 3/10* (2013.01); *B67C 3/2628* (2013.01)

(58) Field of Classification Search
CPC ......... B67C 3/10; B67C 3/2628; B67C 3/262; F17C 2221/013
See application file for complete search history.

(56) References Cited

U.S. PATENT DOCUMENTS

| | | | |
|---|---|---|---|
| 4,903,741 | A | 2/1990 | Ibanez |
| 6,910,499 | B2 | 6/2005 | Chan |
| 7,128,105 | B2 | 10/2006 | Tribble et al. |
| 7,258,127 | B1 | 8/2007 | Schneider |
| 8,631,818 | B2 | 1/2014 | Mitrovich |

(Continued)

FOREIGN PATENT DOCUMENTS

| | | |
|---|---|---|
| CN | 101228071 B | 4/2011 |
| EP | 2154418 | 2/2010 |

(Continued)

OTHER PUBLICATIONS

PCT International Search Report and Written Opinion for PCT Application No. PCT/U82020/031700, dated Jul. 30, 2020 (10 pages).

*Primary Examiner* — Jason K Niesz
(74) *Attorney, Agent, or Firm* — HALEY GUILIANO LLP

(57) ABSTRACT

The present disclosure provides systems and methods for refilling fluid containers. A fluid container may include a bottle and a valve assembly. The valve assembly may include two valves and be configured to engage with the bottle and a filling head or dispensing head. A system is configured to provide pressurized fluid to the refillable container, monitor filling, determine when to stop filling, and determine how much fluid was provided. The valve assembly may include a float mechanism coupled to one of the valves of the valve assembly to ensure fluid flow is stopped when the fluid container is full. The fluid, which can include carbon dioxide, is stored in a storage tank. A flow system provides the fluid to a filling head, which engages with the fluid container. The flow system includes a transfer pump, valves, and sensors configured to provide the fluid to the filling head.

18 Claims, 15 Drawing Sheets

(56) References Cited

U.S. PATENT DOCUMENTS

| | | | | |
|---|---|---|---|---|
| D779,046 | S * | 2/2017 | Tansey, Jr. | D23/262 |
| 10,846,975 | B2 | 11/2020 | Tansey, Jr. et al. | |
| 2001/0045242 | A1 | 11/2001 | Clusserath | |
| 2002/0038676 | A1 | 4/2002 | Siegele et al. | |
| 2009/0095370 | A1* | 4/2009 | Krulitsch | B67C 3/2608 141/46 |
| 2010/0154364 | A1 | 6/2010 | Bernhard | |
| 2011/0306681 | A1 | 12/2011 | Takenouchi | |
| 2012/0085071 | A1 | 4/2012 | Krones | |
| 2013/0106027 | A1 | 5/2013 | Maki | |
| 2013/0180619 | A1 | 7/2013 | Clusserath | |
| 2015/0329341 | A1 | 11/2015 | Wilder et al. | |
| 2016/0284153 | A1* | 9/2016 | Tansey, Jr. | B65B 3/04 |
| 2017/0158480 | A1* | 6/2017 | Bandini | B67C 3/2614 |
| 2021/0039937 | A1 | 2/2021 | Tansey et al. | |
| 2023/0219800 | A1 | 7/2023 | Tansey, Jr. et al. | |

FOREIGN PATENT DOCUMENTS

| | | | |
|---|---|---|---|
| GB | 2111646 | A | 7/1983 |
| WO | 2016129788 | A1 | 8/2016 |

* cited by examiner

FIG. 23
2300
RECEIVE USER INDICATION 2302
DETERMINE FLUID CONTAINER INFORMATION 2304
DETERMINE FLUID SYSTEM INFORMATION 2306
ENGAGE FLUID CONTAINER 2308
PROVIDE FLUID TO FLUID CONTAINER 2310
IDENTIFY STOP CONDITION 2312
ISOLATE SUPPLY FROM FLUID CONTAINER 2314

FLUID FILLING SYSTEMS AND METHODS

CROSS-REFERENCE TO RELATED APPLICATIONS

This application is a continuation of U.S. patent application Ser. No. 16/868,144, filed May 6, 2020 (now U.S. Pat. No. 11,208,310), which claims the benefit of U.S. Provisional Patent Application No. 63/843,912, filed May 6, 2019, the disclosures of which are hereby incorporated by reference herein in their entireties.

The present disclosure is directed towards filling systems and methods and, more particularly, the present disclosure is directed towards systems and methods for filling refillable bottles and refillable bottles that include a filling shutoff mechanism.

INTRODUCTION

Fluids that undergo a phase change are used in a wide variety of applications. For example, nitrogen, gasoline, ammonium hydroxide, propane, oxygen, and carbon dioxide are typical fluids that are stored and used in more than one phase (e.g., liquid phase and gas phase). Fluids must be stored at desired conditions (e.g., temperature, pressure, density) in a sealed container to prevent dilution with, or contamination from, the atmosphere. Containers need to be designed to withstand structural loads, allow filling and dispensing, and interface to an end use system. It would be advantageous to manage filling, storing, dispensing, and tracking of fluid containers in a convenient way for a user.

Filling and refilling containers may pose some challenges. For example, some challenges include ensuring that a container is not overfilled and is filled with a desired amount of fluid. In a further example, reliable and repeatable operation requires preventing damage to filling equipment or the container during filling. It would be advantageous to accurately fill and refill containers and prevent damage to equipment.

SUMMARY

In some embodiments, the present disclosure is directed to a valve assembly configured to interface to a bottle. The valve assembly includes a first valve having a first valve seat and a valve pin configured to move along a first axis and to seal and unseal against the first valve seat to allow and prevent a flow of a fluid. The valve assembly also includes a float having a density less than that of a liquid phase of the fluid, configured to move along a second axis parallel to the first axis. The valve assembly also includes a linkage coupled to the valve pin and to the float and, as the float moves along the second axis, the linkage causes the valve pin to move along the first axis.

In some embodiments, the present disclosure is directed to a refillable fluid container for storing pressurized fluid. The refillable fluid container includes a bottle and a valve assembly. The bottle includes a side wall defining an inner volume, and a port arranged at an axial end of the bottle and configured to allow a fluid to enter and exit the inner volume. The valve assembly is affixed to the bottle at the port. The valve assembly includes a valve pin configured to move along a first axis, a float, and a linkage. The float has a density less than that of a liquid phase of the fluid, and is configured to move along a second axis parallel to the first axis. The linkage is coupled to the valve pin and to the float, wherein as the float moves along the second axis the float causes the valve pin to move along the first axis.

In some embodiments, the valve assembly includes a valve body having a valve seat. The valve pin is further configured to move along the first axis between an opened position and a closed position, and the valve pin is configured to interface to the valve seat in the closed position.

In some embodiments, the first axis and the second axis are coincident. For example, the valve pin and the float may move along substantially the same axis.

In some embodiments, the refillable fluid container includes an identification tag affixed to the sidewall. The identification tag stores information about the refillable fluid container.

In some embodiments, the fluid has a corresponding pressure of at least 500 psi (34.5 bar).

In some embodiments, the fluid includes liquid carbon dioxide. Liquid carbon dioxide is used to, for example, provide carbonation to beverages.

In some embodiments, the valve assembly further includes a relief port configured to allow the fluid to exit the valve assembly when the fluid reaches a predetermined pressure.

In some embodiments, the valve assembly includes a lip that interfaces to the axial end of the bottle. The lip has a corresponding outer dimeter greater than an outer diameter of the bottle at the axial end.

In some embodiments, the valve assembly includes a threaded section extending axially away from the axial end of the bottle.

In some embodiments, the valve assembly includes a first axial section, a second axial section, and a third axial section. The first axial section is configured to interface to the axial end of the bottle. The second axial section includes a groove extending azimuthally. The groove is axially further from the axial end of the bottle than the first axial section. The third axial section includes a threaded section. The third axial section is axially further from the axial end of the bottle than the groove.

In some embodiments, the valve assembly includes a first axial section, a second axial section, and a third axial section. The first axial section is configured to interface to the axial end of the bottle. The second axial section is positioned axially further from the axial end of the bottle than the first axial section. The second axial section includes a first recess having a first azimuthal position and a second recess having a second azimuthal position diametrically opposed to the first azimuthal position. The third axial section includes a threaded section. The third axial section is positioned axially further from the axial end of the bottle than the second section.

In some embodiments, the linkage includes a first member and an arm. The first member is coupled to the float and configured to move substantially parallel to the second axis. The arm is coupled to the first member and configured to rotate about a hinge point. The arm is coupled to the valve pin at a connection point and, as the arm rotates about the hinge point, the arm causes the valve pin to move along the first axis.

In some embodiments, the port has a corresponding throat diameter of less than twenty millimeters (mm). For example, in some embodiments, the throat diameter is approximately 16.5 mm. In some embodiments, the internal diameter of the bottle is larger than the throat diameter. For example, the internal diameter of the bottle may be approximately 54 mm and the float must fit and function within that diameter.

In some embodiments, the valve assembly includes a guide body arranged along the second axis. The float includes an annular cross section surrounding the second axis, and the guide body constrains the float to move along the second axis.

In some embodiments, the first axis is arranged along a long dimension of the bottle and the first axis is centered radially relative to the bottle.

In some embodiments, the refillable fluid container includes an identification tag that includes a tare weight corresponding to an empty state of the inner volume and a volume capacity corresponding to the inner volume.

In some embodiments, the valve assembly includes an outlet port configured to direct the fluid to enter and exit the inner volume. The float is configured to achieve an empty position, and the outlet port is arranged axially on the opposite of the float from the valve pin when the float is at the empty position.

In some embodiments, the present disclosure is directed to a method for filling a refillable fluid container. The method includes determining, using control circuitry, that a bottle assembly is arranged on a stage. The bottle assembly includes a bottle having a port and a valve assembly. The valve assembly includes a first valve and a second valve. The second valve includes a float mechanism configured to close the second valve. The method includes identifying, using the control circuitry, information about the bottle assembly. The method includes determining, using the control circuitry, an initial weight of the bottle assembly. The method includes determining, using the control circuitry, whether to fill the bottle assembly based on at least one of the information about the bottle assembly and the weight of the bottle assembly. The method includes causing, using the control circuitry, engagement of a filling head with the first valve of the bottle assembly in response to determining to fill the bottle assembly. The method includes causing, using the control circuitry, a flow system to provide a fluid to the filling head for filling the bottle assembly through the first valve. The method includes measuring, using a pressure sensor coupled to the control circuitry, a pressure of the fluid provided to the filling head. The pressure sensor is capable of detecting when the float mechanism closes the second valve. The method includes determining, using the control circuitry, to cease providing the fluid to the filling head for filling the bottle assembly based on one of the measured pressure of the fluid provided to the filling head and the initial weight. The method includes causing, using the control circuitry, the flow system to cease providing the fluid in response to determining to cease providing the fluid to the filling head for filling the bottle assembly. The method includes causing, using the control circuitry, disengagement of the filling head from the valve.

In some embodiments, identifying the information about the bottle assembly includes receiving the information from an identification tag of the bottle assembly.

In some embodiments, determining the initial weight of the bottle assembly is performed before causing the engagement of the filling head with the first valve.

In some embodiments, the method includes determining, after causing the disengagement of the filling head from the first valve, a final weight of the bottle assembly. In some such embodiments, the method includes determining an amount of the fluid provided to the bottle assembly based on a difference between the final weight and the initial weight.

In some embodiments, causing the flow system to provide the fluid from the filling head to the bottle assembly includes activating a transfer pump and opening at least one shutoff valve.

In some embodiments, the transfer pump comprises a gas-actuated transfer pump. In some embodiments, the gas actuated transfer pump includes a gas inlet port coupled to a freeboard region of a fluid supply tank by a pump valve. The freeboard region is at a tank pressure. In some embodiments, the gas actuated transfer pump includes an inlet fluid port coupled to a liquid region of a fluid supply tank, and the liquid region is at the tank pressure. In some embodiments, the gas actuated transfer pump includes an outlet fluid port coupled to the filling head. In some embodiments, the method includes opening the pump valve to actuate the gas-actuated transfer pump.

In some embodiments, causing the flow system to provide the fluid from the filling head to the bottle assembly through the valve includes determining temperature information and controlling the flow system to provide the fluid based on the temperature information.

In some embodiments, the temperature information includes at least one of an environmental temperature and a temperature of the fluid.

In some embodiments, the method includes determining an amount of the fluid provided to the bottle assembly based on flow information received from a flow meter arranged in-line with the filling head.

In some embodiments, the flow information includes at least one of a sequence of flow rate values of the fluid over time and a total amount of the fluid provided in a time interval between causing engagement and disengagement of the filling head with the first valve.

In some embodiments, the method includes identifying a feature of the measured pressure, and the determining to cease providing the fluid to the filling head for filling the bottle assembly is based on the feature.

In some embodiments, the feature includes one of a peak, a value relative to a threshold, a step, a rate of increase, and a pressure wave.

In some embodiments, determining to cease providing the fluid to the filling head for filling the bottle assembly includes determining that the second valve of the bottle assembly is closed based on the feature.

In some embodiments, the flow system provides the fluid to the filling head at a pressure of at least 500 psi (34.5 bar).

In some embodiments, the present disclosure is directed to a system for filling a refillable fluid container. The system includes a stage having a weight sensor configured to sense a weight of a bottle assembly. The system includes a filling head configured to engage with the bottle assembly to provide a fluid to the bottle assembly. The system includes a flow system coupled to the filling head and configured to provide the fluid to the filling head. The system includes a pressure sensor coupled to the flow system. The system includes control circuitry. The control circuitry is configured to determine that the bottle assembly is arranged on the stage. The bottle assembly includes a bottle having a port and a valve assembly having a first valve and a second valve. The second valve includes a float mechanism configured to close the second valve. The control circuitry is configured to identify information about the bottle assembly. The control circuitry is configured to determine an initial weight of the bottle assembly based on the weight sensor. The control circuitry is configured to determine whether to fill the bottle assembly based on at least one of the information about the bottle assembly and the weight of the bottle assembly. The control circuitry is configured to cause the filling head to engage with the first valve in response to determining to fill the bottle assembly. The control circuitry is configured to cause the flow system to provide the fluid to the filling head. The control circuitry is configured to determine a pressure of the fluid provided to the filling head based on the pressure sensor. The pressure sensor is capable of detecting when the float mechanism closes the second valve. The control circuitry is configured to determine to cease providing the fluid to the filling head for filling the bottle assembly based on one of the pressure of the fluid provided to the filling head and the initial weight. The control circuitry is configured to cause the flow system to cease providing the fluid in response to determining to cease providing the fluid to the filling head for filling the bottle assembly. The control circuitry is configured to cause disengagement of the filling head from the valve assembly (e.g., the first valve).

In some embodiments, the present disclosure is directed to a system for filling a container with fluid. The system includes a supply tank configured to store a fluid existing in two phases at a first pressure. The supply tank includes a first supply port arranged to allow a liquid phase of the fluid to flow from the supply tank and a second supply port arranged to allow a gas phase of the fluid to flow from the supply tank. The system includes a filling head. The system includes a transfer pump configured to pump the fluid from the supply tank to the filling head. The transfer pump includes a first pump port coupled to the first supply port and a second pump port coupled to the second supply port. The gas phase and the liquid phase of the fluid do not mix at the transfer pump. The gas phase of the fluid provides energy to the transfer pump to pump the liquid phase of the fluid. The system includes control circuitry configured to control operation of the transfer pump to provide the fluid to a bottle assembly.

In some embodiments, the system includes a pressure sensor coupled to the control circuitry configured to sense a pressure of the fluid upstream of the bottle assembly. In some embodiments, the system includes at least one valve coupled to the control circuitry and arranged in-line with the filling head. The at least one valve is configured to open and close thereby allowing and preventing flow of the fluid from the supply tank to the bottle assembly. The control circuitry is configured to control the at least one valve based on the sensed pressure.

In some embodiments, the system includes a temperature sensor coupled to the control circuitry. In some such embodiments, the temperature sensor is configured to sense at least one temperature of an environmental temperature and a fluid temperature and provide a temperature signal to the control circuitry indicative of the at least one temperature. The control circuitry is further configured to control the operation of the transfer pump to provide the fluid to the bottle assembly based on the temperature signal.

In some embodiments, the system includes a gripping mechanism configured to engage the bottle assembly and maintain a relative position of the filling head and the bottle assembly.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In some embodiments, the present disclosure describes methods and systems for managing gas dispensing and refillable containers.

Figure 1:
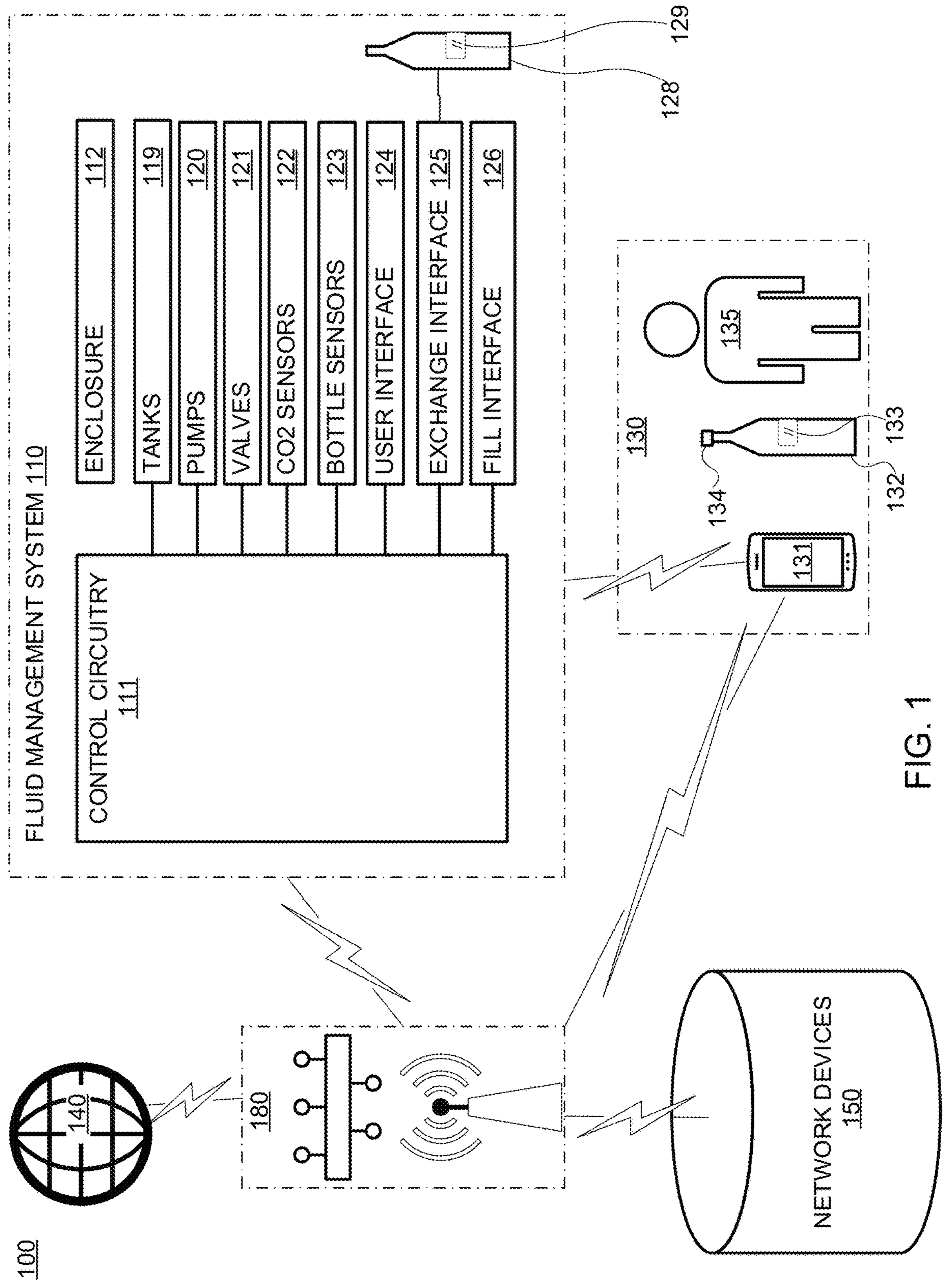
FIG. 1 shows a block diagram of an illustrative system for managing bottle filling and dispensing, in accordance with some embodiments of the present disclosure.

FIG. 1 shows a block diagram of illustrative system 100 for managing bottle filling and dispensing, in accordance with some embodiments of the present disclosure. System 100 includes fluid management system 110, with which user entity 130 may interact, and which may communicate via network 180 with devices connected to internet 140, network devices 150, user device 131 and any other devices. Network 180 may include, for example, a local area network (LAN), a wide area network (WAN), a wireless area network (WLAN), a subnet, any other suitable network, or any combination thereof. For example, system 110 may include a wireless access point (e.g., of control circuitry 111) in communication with a LAN (e.g., network 180) having connectivity to internet 140 provided by an internet service provider. In a further example, system 110 and user device 131 may each include a respective wireless access point, which are configured to communicate with each other via a WAN (e.g., network 180). Network devices 150 may include databases, servers, central processing facilities, any other suitable device coupled to a communications network, coupled to the internet, or any combination thereof.

In an illustrative example, system 100 allows for a user to refill a bottle already in their possession, purchase a new bottle, return an old bottle, or otherwise manage the process of refilling refillable containers. In a further example, system 100 need not exchange bottles, and may provide refilling only. In some circumstances, a user may return an expired or damaged bottle. For example, in some embodiments, bottles may need to be returned within five years for hydrostatic testing. Accordingly, system 100 may accept old or expiring bottles.

Fluid management system 110, also referred to as a filling station, is configured to provide fluid container services for user entity 130. For example, fluid management system 110 provides filling services via fill interface 126 for bottle 132 provided by user 135. In a further example, fluid management system 110 provides dispending services via exchange interface 125 of fluid containers (e.g., fluid container 128) to a user needing a fluid container or an additional fluid container. User 135 may provide partially or fully emptied fluid container 132, identified by electronic identifier 133, for refill.

Accordingly, user 135 may interact with user interface 124 of fluid management system 110 or may use a software application (an "app") hosted by user device 131 (e.g., a smart phone, laptop, tablet, or other suitable user device) to communicate and interact with fluid management system 110. Fluid management system 110 is more fully described, for example, in the context of FIGS. 2-5. System 100 is described in the context of carbon dioxide, but it will be understood that any suitable fluid may be used in accordance with the present disclosure.

Fluid management system 110, as illustrated, includes control circuitry 111, tanks 119, pumps 120, valves 121, CO2 sensors 122, bottle sensors 123, user interface 124, exchange interface 125, and fill interface 126. Tanks 119 include pressure vessels having an inner volume configured to store fluid (e.g., accumulate fluid during inflow from tank filling and outflow from bottle filling). For example, tanks 119 may include one or more tanks having fill ports, vent ports, outlet ports, a siphon tube, sensors, safety equipment, any other suitable features, or any suitable combination thereof. Tanks 119 may be, but need not be, refillable. In a further example, tanks 119 may include high pressure cylinders or bulk low-pressure cryogenic storage tanks. Pumps 120 include one or more pumps configured to pump the fluid from a first pressure to a second pressure by inputting work to the fluid. For example, pumps 120 may include rotary pumps, piston pumps, diaphragm pumps, any other suitable type of pump, actuated by any suitable energy source, or any combination thereof. In an illustrative example, pumps 120 may include a gas-operated piston pump. In some embodiments, one or more filters may be included in-line with the pump (e.g., a powered filter, a moisture filter, a particulate filter, or other suitable filter). Valves 121 include one or more valves configured to allow or prevent flow to the refillable bottle. For example, valves 121 may include open-close solenoid valves having any suitable valve seat configuration, having any suitable number of ports, and actuated by any suitable energy source (e.g., DC power, AC power, pneumatic power, hydraulic power). In a further example, valves 121 may include a vent valve that does not vent while a bottle is in fluid communication with the filling head, but rather acts as a safety device that can be pre-set to a cracking pressure (e.g., during filling if the pressure becomes dangerous, it will vent). CO2 sensors 122 include one or more sensors configured to sense a temperature, a pressure, a concentration, or other suitable property of carbon dioxide. For example, CO2 sensors 122 may include a thermocouple (e.g., in the fluid stream), a resistance temperature detector (RTD), a thermistor, a pressure transducer (e.g., a strain gage transducer exposed to the fluid), an optical CO2 concentration sensor (e.g., an NDIR sensor), a chemical CO2 concentration sensor, any other suitable sensor, or any combination thereof. Bottle sensors 123 include one or more sensors configured to sense information about a refillable container. For example, bottle sensors 123 may include an optical sensor (e.g., for determining position based on imaging, detection, or other photonic technique), an identification sensor (e.g., an RFID tag reader), a scale (e.g., to measure the weight of a bottle and contents), any other suitable sensor, or any combination thereof. User interface 124 is configured to provide information to, and receive information from, a user (e.g., user 135). For example, user interface 124 may include a display screen, touchscreen, microphone, speaker, camera, touchpad, keypad, software configured to communicate with a software application installed on user device 131, any other suitable interface for interacting with a user, or any combination thereof. Exchange interface 125 includes bottle positioning and storing mechanisms configured to provide bottles, receive bottles, and store bottles based on transactions. For example, exchange interface 125 may include a cabinet or other volume (e.g., in enclosure 112) configured to store bottles, a gripping mechanism to select a bottle for removal from or placement into the volume, a gravity-based bottle reception or supply mechanism (e.g., a slide), a dispensing stage (e.g., accessible by user 135 and optionally securable by a cover window), any other suitable features, or any suitable combination thereof. Fill interface 126 includes mechanisms for positioning a bottle for filling, providing the fluid to a valve of the bottle, and providing the filled bottle to the user. For example, fill interface 126 may include a filling head configured to engage with a valve of a refillable bottle and allow fluid to flow to or from the bottle, a stage configured for positioning the bottle (e.g., a stage having actuated position control), a gripping mechanism to more securely affix the bottle to the filling head, any other suitable features, or any combination thereof.

In an illustrative example, fluid management system 110 may include a supply tank having an outlet port. The outlet port may be coupled in-line to a first valve, and then a gas-operated transfer pump. The transfer pump may pump the fluid in-line through another shut-off valve (when opened), and to fill interface 126 to fill a refillable bottle. A pressure transducer upstream of fill interface 126 may sense fluid pressure and transmit a signal indicative of the pressure to control circuitry 111.

In a further illustrative example, user 135 may have user device 131, which is a smart phone in this example, and a partially empty bottle 132. User 135 places bottle 132 into a receptacle of fill interface 126 for filling. Control circuitry 111 determines bottle information such as the current weight based on a scale (e.g., of bottle sensors 123), and a tare weight based on identification tag 133 (e.g., an RFID tag here). Based on a position sensor of bottle sensors 123, control circuitry 111 causes a stage of fill interface 126 to position bottle 132 for filling. Control circuitry 111 then opens one or more valves 121, activates a transfer pump (e.g., of pumps 120) to provide fluid to bottle 132, and monitors the fluid pressure upstream of the filling head using a pressure transducer of $CO_2$ sensors 122. When a float-actuated shut-off valve of the bottle closes and fluid can no longer enter the bottle, the control circuitry may, based on a fluid pressure signal indicating an increase in fluid pressure, then cause the pump to shutoff, a vent valve of valves 121 to open (e.g., to reduce fluid pressure in the filling head), and determine the total amount of fluid provided to the bottle. The total amount of fluid may be determined by performing a final weight measurement, integrating a time series of flow rate information (e.g., a numerical quadrature), any other suitable technique, or any combination thereof (e.g., multiple techniques may be used for verification).

In a further illustrative example, user 135 downloads a software application (the "app") and creates a user profile (e.g., user information, payment information, and bottle information). User 135 may then use the app to locate the nearest filling station. User 135 can use the app to prepay for a refill of an existing bottle (e.g., bottle 132) or prepay for a new bottle (e.g., bottle 128). If user 135 already owns a bottle (e.g., bottle 132), then they prepay and they get credit on their account so when they visit a filling station and place their bottle in the machine the bottles electronic identification communicates with the filling station and pulls the users account information. Accordingly, the filling station has the prepayment information for a refill and allows user 135 to use that credit to refill their bottle. In some embodiments, a new user (e.g., first time user) downloads the app and sets up an account with prepayment information. In some such embodiments, when the user accesses the filling station for the first time, they will have to identify themselves for the filling station to access their account. Upon identification, the new bottle is dispensed by the filling station. In an illustrative example, a user may present a Quick Response (QR) code, or other barcode of any suitable dimension, to a scanner of user interface 124 of fluid management system 110. In a further example, the user may enter identifying information (e.g., a username, password, code, or other suitable identifying information) to user interface 124.

In a further illustrative example, user 135 may have user device 131, which is a smart phone in this example, and may wish to purchase a bottle (e.g., bottle 128). User 135 provides a request to purchase a bottle to user interface 124 (e.g., by selecting options on a touchscreen and providing payment information). Control circuitry 111 identifies bottle 128 as being available and may access bottle information such as the tare weight, capacity, or other property based on identification tag 129 (e.g., an RFID tag here). Control circuitry 111 then causes a mechanism of exchange interface 125 to provide bottle 128 to the user. Depending upon user preferences, predetermined operation of fluid management system 110, or other criterion, bottle 128 may already be filled, may be filled upon purchase, or may be dispensed empty for subsequent filling.

Identification tags 133 and 129 include information about respective bottles 132 and 128. In some embodiments, identification tags 133 and 129 are encrypted, and fluid management system 110 is capable of decryption to access the information contained therein. The information may include a serial number (e.g., to track individual bottles), creation date (e.g., when manufacturing completed), DOT designation (e.g., based on geometry, material, anticipated contents), fill history (e.g., number of fills, if the tags are writable), capacity information (e.g., volume capacity, max/min pressure or max/min temperature), fluid compatibility information, tare weight (e.g., weight of the bottle and valve, for filling calculations), any other suitable information, or any combination thereof. In an illustrative example, identification tags 129 and 133 may be RFID tags attached to respective bottles 128 and 132 during manufacturing. In some embodiments, identification tags 129 and 133 are tamper resistant such that tampering with a tag causes it to not communicate with an identification tag reader/writer. For example, tamper-resistance may help prevent a user from removing an identification tag off of a cylinder and place it on another cylinder (e.g., which may have different properties or might not be compatible with fill interface 126). In a further example, tampering with an identification tag can be dangerous because each bottle may have a slightly different tare weight, which might cause overfilling or machine damage. In some embodiments, fluid management system 110 is configured to not provide filling services unless it verifies a suitable and identifiable bottle is placed at fill interface 126. In some embodiments, an identification tag may be retrofitted onto bottles of a different design than bottles 132 and 128. For example, the valve of the refillable container may be configured to interface to more than one type or brand of fill interface, and an identification tag may be retrofitted on the container to store information. In an illustrative example, a container may be fitted with a collar attached to cylinder with adhesive at the bottle neck having one or more embedded RFID tags. Further, state information (e.g., tare weight, capacity, mechanical compatibility, fluid compatibility, date) of the bottle may be identified and programmed onto the tag.

In some embodiments, bottles 128 and 132 include an optical identifier to provide identification information. For example, an optical code (e.g., a 1d or 2d barcode) printed on bottle to identify it. In some embodiments, an optical identifier is used as a secondary identification means (e.g., a bottle may include an RFID tag and a barcode).

Fluid management system 110, as illustrated in FIG. 1, includes enclosure 112. Enclosure 112 provides, for example, an exterior having design elements (e.g., advertisement or identification markings or designs), protection to components from environmental factors (e.g., tampering, local weather, local activity), protection to people from components (e.g., safety hazards, noise, or fluid concentrations), any other suitable functions, or any combination thereof. For example, enclosure 112 may include structural frame elements, sheet metal, protective screens or windows, lighting, access points (e.g., doors or windows that can open and close), any other suitable features, or any combination thereof. In some embodiments, enclosure 112 includes a filter to reduce a concentration of gas phase fluid outside of the fluid lines. For example, the filter may include a chemical "sponge" configured to filter out carbon dioxide from the air in enclosure 112. To illustrate, bases such as soda lime, sodium hydroxide, potassium hydroxide and lithium hydroxide (e.g., lithium hydroxide has been used aboard spacecraft to remove carbon dioxide from the local atmosphere) are able to remove carbon dioxide by chemically reacting with it. Any suitable filter may be included to absorb gas phase constituents (e.g., any stray carbon dioxide gas) that form inside enclosure 112.

In some embodiments, one or more concentration sensors (e.g., of CO2 sensors 122) are configured to sense the level of gas phase fluid inside enclosure 112. In some embodiments, one or more concentration sensors (e.g., of CO2 sensors 122) are configured to sense the level of gas phase fluid outside of enclosure 112 (e.g., immediately outside of enclosure 112). For example, control circuitry 111 may be configured to determine real time concentration data and communicate the data to a central monitoring facility or system (e.g., via network 180) to alert the monitoring facility to send notification to a technician that something is wrong. In some embodiments, control circuitry 111 is configured to send alerts if a concentration level meets or exceeds a threshold value (e.g., above a predetermined ppm level). An alert may include, for example, a text message (e.g., via a cellular network), an email message (e.g., via the internet), an automated phone call (e.g., via a cellular network), an indicator light on a control panel at a monitoring facility, any other suitable indication, or any combination thereof.

In some embodiments, enclosure 112 may include an exhaust system. For example, fluid management system 110 may include a vent system configured to send the vent exhaust out of enclosure 112 via a tube to the outside environment. In an illustrative example, a filling port or vent port connection may be used to provide a path for vented fluid to reach the outside. In some embodiments, enclosure 112 includes an exhaust fan configured to be constantly on, controlled by control circuitry 111 based on concentration (e.g., turning the fan on and off when concentration levels reach a designated level and require venting), or both. In some embodiments, enclosure 112 may include an air exchange system configured to remove gas phase fluid from enclosure 112 and replaces it with fresh air from another location (e.g., outside of enclosure 112).

In some embodiments, fluid management system 110 includes a fluid container sanitizer configured to clean, disinfect, or otherwise condition the fluid container. In some embodiments, for example, fluid management system 110 includes an ultraviolet light source, arranged to provide ultraviolet light to the surfaces of a valve of a fluid container to disinfect it. Typically, the effectiveness of disinfection is dependent on bulb wattage and duration. The higher the bulb wattage, the shorter the 99.9% kill time becomes. For example, in some circumstances, the ultraviolet light source (e.g., emitting UV-C wavelength photons that are mutagenic to organisms) may be turned on for a 5-10 second exposure to kill 99.9% of germs before the bottle assembly is engaged with the filling head. In some embodiments, fluid management system 110 includes a chemical spray system configured to apply a disinfecting spray onto a fluid container. For example, the chemical spray system may be positioned to apply an aerosol of a disinfecting agent onto a valve of a fluid container to disinfect it. In a further example, a nozzle of the chemical spray system may be configured to spray a predetermined amount of disinfectant spray onto the valve, killing 99.9% germs.

Figure 2A:
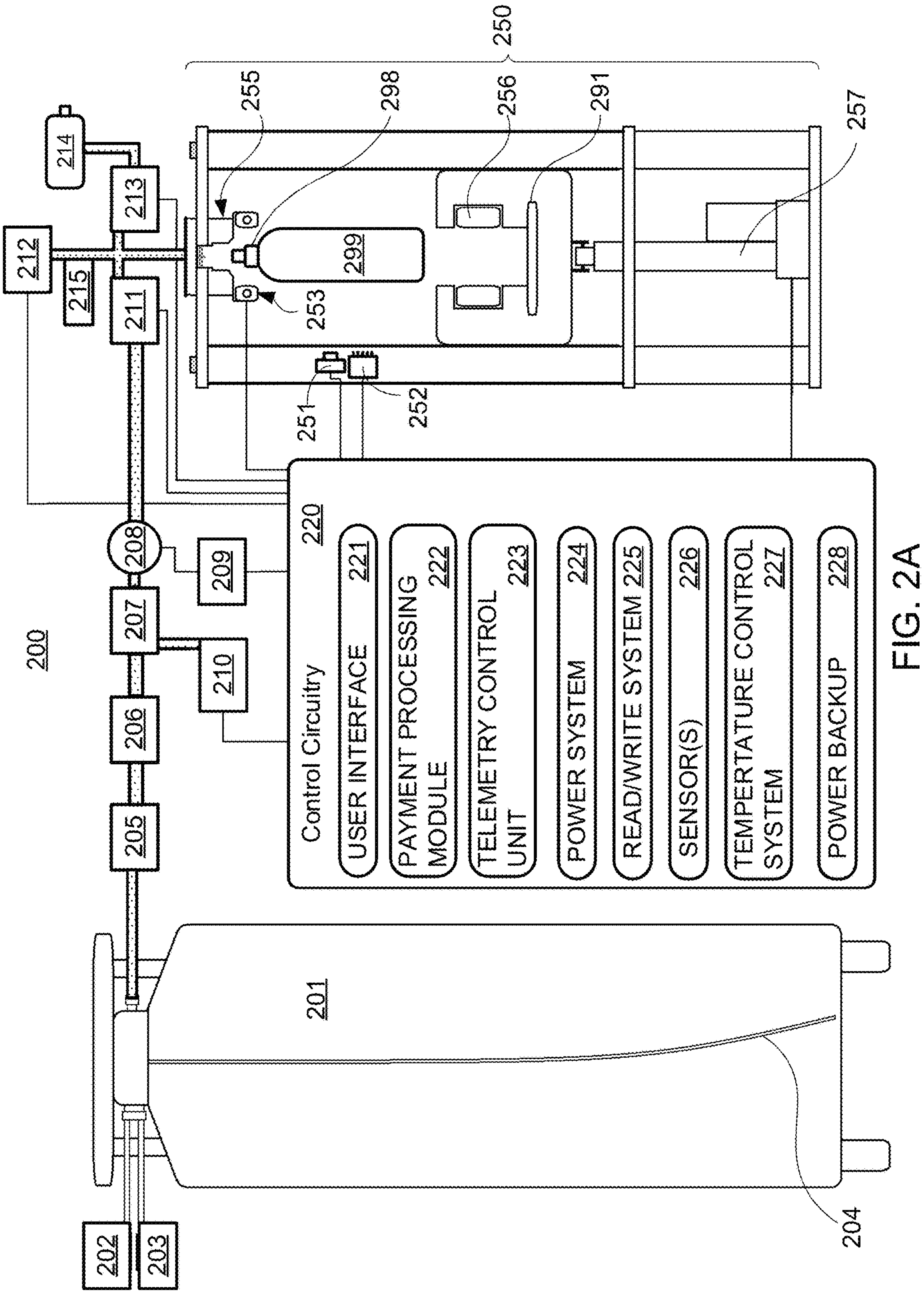
FIG. 2A shows a block diagram of an illustrative system for managing bottle filling, with the bottle in an intermediate position, in accordance with some embodiments of the present disclosure.
Figure 2B:
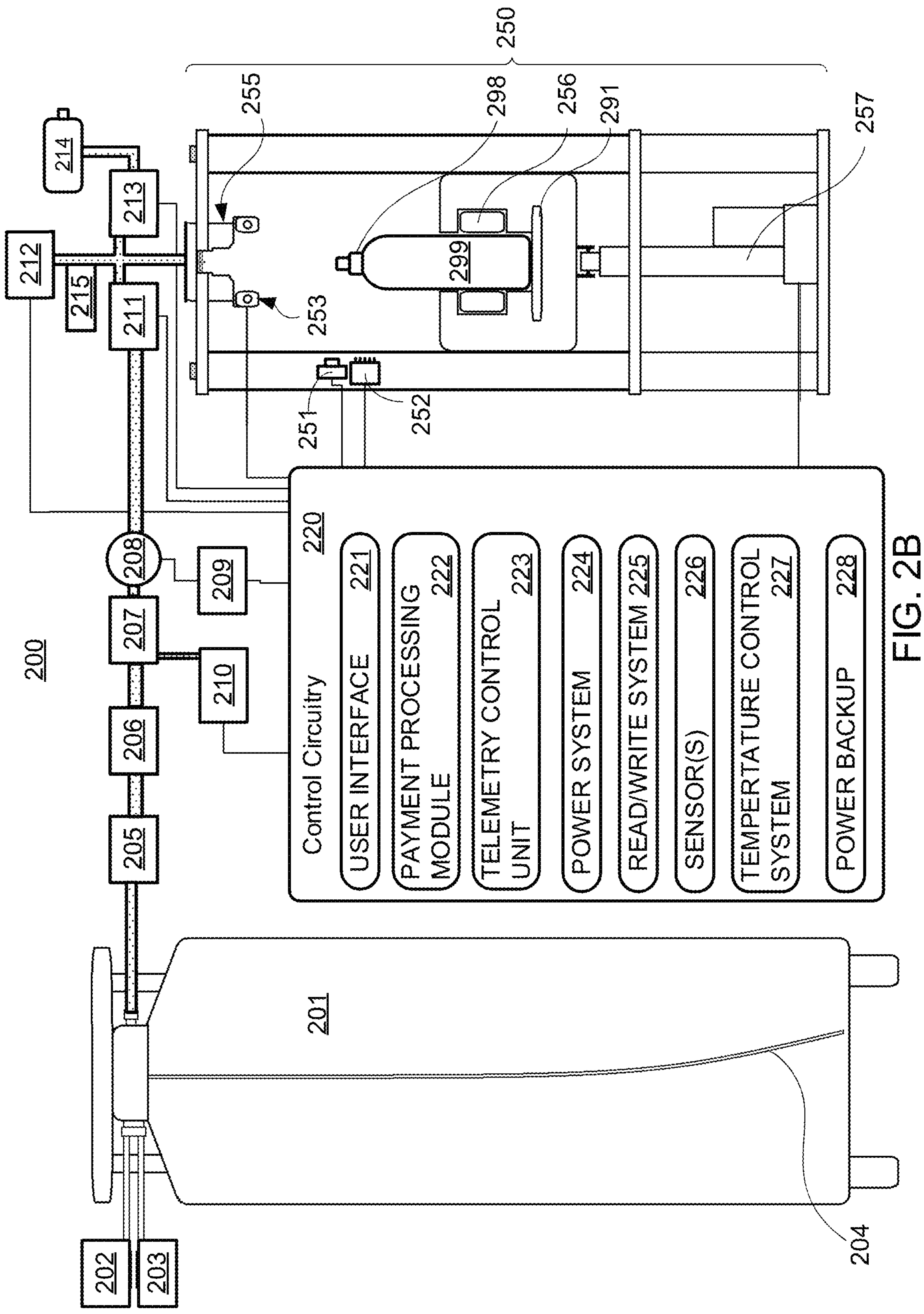
FIG. 2B shows a block diagram of the illustrative system of FIG. 2A, with the bottle in a secured position, in accordance with some embodiments of the present disclosure.
Figure 2C:
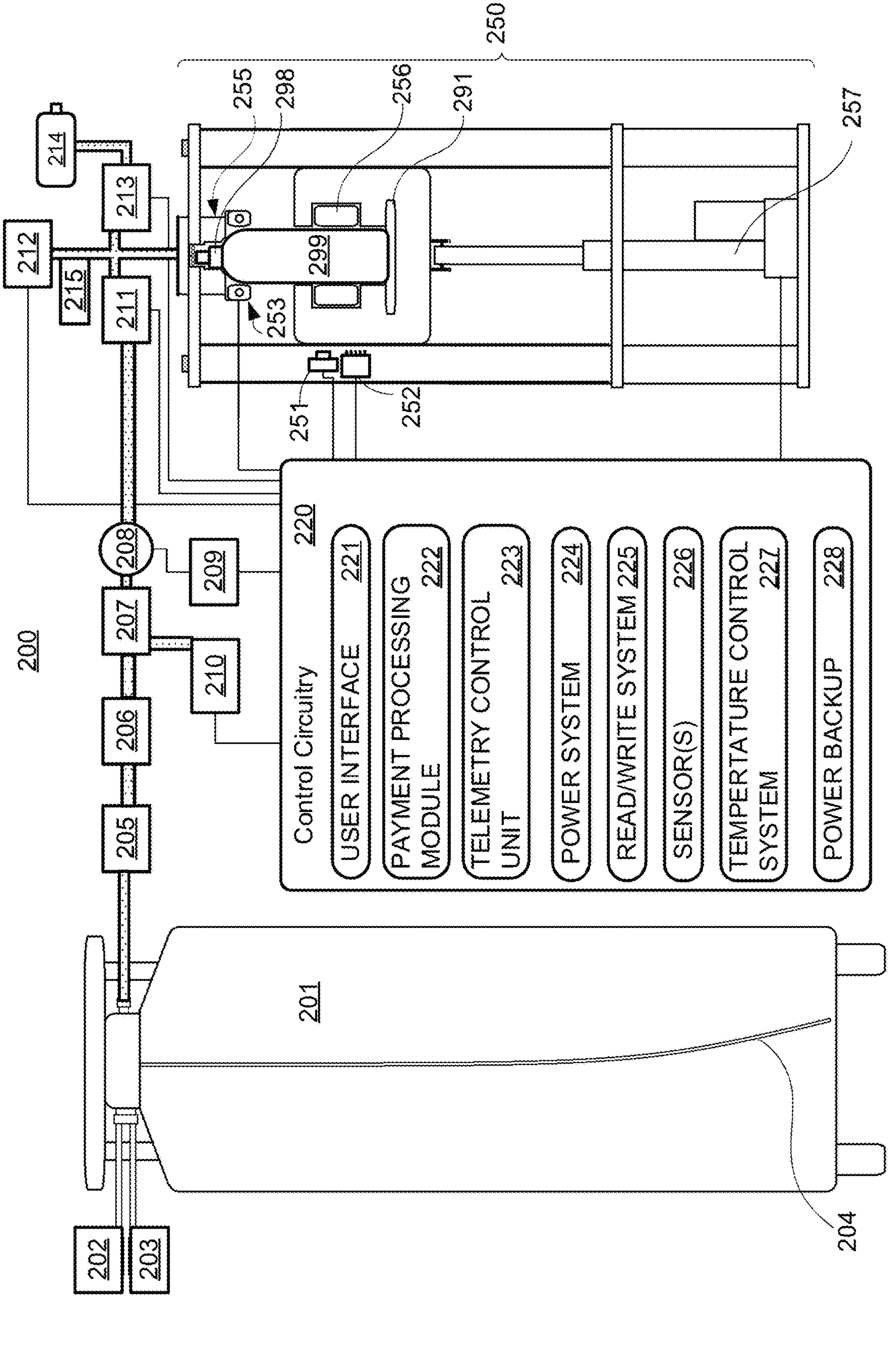
FIG. 2C shows a block diagram of the illustrative system of FIG. 2A, with the bottle in a filling position, in accordance with some embodiments of the present disclosure.

FIG. 2A shows a block diagram of illustrative system 200 for managing bottle filling, with bottle 299 in an intermediate position, in accordance with some embodiments of the present disclosure. For example, system 200 may correspond to fluid management system 110 of FIG. 1. An illustrative arrangement of components is illustrated in FIG. 2A. It will be understood that one or more components may be rearranged, or omitted, in accordance with the present disclosure. FIG. 2B shows a block diagram of illustrative system 200 of FIG. 2A, with bottle 299 in a secured position, in accordance with some embodiments of the present disclosure. FIG. 2C shows a block diagram of illustrative system 200 of FIG. 2A, with bottle 299 in a filling position, in accordance with some embodiments of the present disclosure.

Supply tank 201 is configured to store the fluid under pressure. Supply tank 201 has a corresponding inner volume where the fluid is stored. Siphon tube 204 is arranged in the inner volume of supply tank 201 and is configured to allow the liquid phase of the fluid to be dispensed from supply tank 201 (e.g., avoiding the gas phase, or a mixed phase to be dispensed). Fill port 202 is configured to allow supply tank 201 to be filled from an external source. Vent 203 is configured to allow the fluid to escape supply tank 201 based on pressure, liquid fill level, or both of the fluid in the tank.

In some embodiments, supply tank 201 includes one or more relatively high-pressure tanks that do not require venting. For example, a high-pressure tank may include a 50 lbs-100 lbs cylinder (e.g., configured to hold 50 lbs-100 lbs of CO2 in the inner volume near 838 psi near 70° F.) that do not vent to atmosphere (e.g., and do not lose fluid to the atmosphere during storage). In a further example, a high-pressure tank may operate at over 500 psi (e.g., over 838 psi or over 1200 psi). Table 1 shows $CO_2$ pressures at temperatures between 40° F. and 80° F., whether the cylinder is full (68% filling density), or if it has been used and only a small portion of liquid $CO_2$ remains. After the $CO_2$ has been used past point of causing all liquid $CO_2$ to change to $CO_2$ gas, pressure will be lower than those listed in Table 1.

TABLE 1

| Subcritical $CO_2$ T-P values. | |
|---|---|
| $CO_2$ Temperature (° F.) | $CO_2$ Pressure (psig/barg referenced to sea level) |
| 40 | 553/38.1 |
| 50 | 638/44.0 |
| 60 | 733/50.5 |
| 70 | 838/57.8 |
| 80 | 960/66.2 |

Above 88° F., (e.g., the critical point of CO2 is near 88° F. and 1070 psi), $CO_2$ exists as a supercritical fluid regardless of pressure. $CO_2$ will have the following approximate pressures at temperatures above 88° F. in cylinders with filling density of 68% $CO_2$. At a given temperature, pressure will decrease proportionately as $CO_2$ is used. Table 2 shows supercritical T-P values for $CO_2$.

TABLE 2

| Supercritical $CO_2$ T-P values. | |
|---|---|
| $CO_2$ Temperature (° F.) | $CO_2$ Pressure (psig/barg referenced to sea level) |
| 90 | 1190/82.0 |
| 100 | 1450/99.9 |
| 110 | 1710/117.9 |
| 120 | 1980/136.5 |
| 130 | 2250/155.1 |

In a further example, a high-pressure tank may be swapped for a new one when empty, although in some examples the tank may be refillable (e.g., via an integrated fill port on the exterior of the tank). In some embodiments, supply tank 201 includes one or more relatively low-pressure tanks. For example, a low-pressure tank may include a 150 lbs-750 lbs tank (e.g., configured to hold 150 lbs-750 lbs of $CO_2$ in the inner volume as a liquid) that is configured to vent to atmosphere (e.g., and accordingly may lose fluid to the atmosphere during storage). In a further example, a low-pressure tank may include a Dewar flask. In a further example, a low-pressure tank may include a cryogenic bulk-storage tank. In a further example, a low-pressure tank may operate at nominally 300 psi (e.g., or at greater or lesser pressures depending upon application and use). For example, a low-pressure tank may operate between approximately 250 and 350 psi (e.g., with a pressure relief valve set for 400-450 psi for venting). In a further example, a low-pressure tank may be refillable using a fill port (e.g., integrated into the tank, or remote and coupled via fluid connections). In a further example, a low-pressure tank may be more easily placed in any environment because it is vented (e.g., being less susceptible to over-pressure caused by temperature change). In a further example, a low-pressure tank my include a double-wall design with the intermediate space between the walls evacuated to reduce heat transfer. Typically, a cylinder must have a 1800 psi (124.1 bar) minimum service pressure for use as a $CO_2$ cylinder.

Supply tank 201 is coupled to valve 205 (e.g., a high-pressure valve) by a tank connector (e.g., CGA320 type connector when the fluid is $CO_2$). In some embodiments, valve 205 is controlled by control module 220 (e.g., a programmable logic controller (PLC)). For example, valve 205 may include any suitable configuration of a valve seat (e.g., needle valve, ball valve, gate valve, or other suitable valve type), with the valve plunger coupled to an electronic solenoid controlled by control module 220. In some embodiments, valve 205 is configured to be "normally-closed" and is opened by control module 220 during filling.

Filter 206 is configured to filter the fluid as it flows from supply tank 201 to fill head 155. Filter 206 is configured to remove debris such as, for example, dust, metal, particles, or other non-fluid components. Filtration helps reduce clogging or damage of orifices and other fluid passages during operation. In some embodiments, filter 206 is an active filter for which the inlet pressure is monitored with a pressure sensor (not shown) and the outlet pressure with a second pressure sensor (not shown). When the difference between the two pressures exceeds a predetermined pressure drop, a notification from the control circuitry can be sent via text, email, SMS, or other type of communication to a central monitoring system so it can be changed on the next service call. In some embodiments, filter 206 includes a passive device that is not monitored and is changed on a time scale (e.g., every 6 months or 12 months).

Transfer pump 207 is configured to pump the fluid to fill head 255 of filling station 250. For example, transfer pump 207 increases the pressure of the fluid from a first pressure (e.g., indicative of supply tank 201) to a second pressure (e.g., used for filling bottle 299). In some embodiments, transfer pump is gas-operated by a pneumatic air supply, which provides energy to pump the fluid (e.g., a liquid) to filling head 255. For example, control circuitry 220 may activate gas compressor 210 to drive transfer pump 207 for a filling process. Although illustrated in FIG. 2A as being actuated by compressed gas, transfer pump 207 may include any suitable type of pump, driven by any suitable energy source. For example, transfer pump 207 may alternatively be driven by an electric motor. In a further example transfer pump 207 may include a centrifugal-type pump.

Flow meter 208 is configured to output a signal indicative of the flowrate of the fluid. The flowrate may be filtered, averaged, discretized, or may otherwise differ from an instantaneous flowrate. For example, flow meter 208 may be a volumetric flow meter (e.g., a turbine flow meter, a vortex flow meter, an ultrasonic flowmeter), a mass flow meter (e.g., a Coriolis-type flow meter, a thermal mass flow meter), or have capacity to act as both a volumetric and mass flow meter. In an illustrative example, flow meter 208 may include any of Coriolis Mass meters, vane/piston meters, float-style meters, positive displacement meters, thermal meters, laminar flow elements, paddle wheel meters, magnetic meters, ultrasonic meters, turbine meters, differential pressure meters, Vortex shredding meters, any other suitable meters, or any combination thereof. In some embodiments, control module 220 is configured to determine a density of the fluid (e.g., based on temperature and pressure, and used to convert between volume and mass). In some embodiments, totalizer 209 is included, configured to provide an indication of the total amount of fluid that is provided to the fill head. In some embodiments flow meter 208 is coupled to totalizer 209, which is configured to provide a total mass or volume of fluid that has been dispensed. In some embodiments, totalizer 209 is integrated into flow meter 208. In some embodiments, totalizer 209 is a separate processing module that receives a signal from flow sensor 208 and provides a signal indicative of the total amount of fluid dispensed to control module 220. In some embodiments, totalizer 209 is integrated into control module 220 (e.g., flow meter 208 is coupled to an I/O interface of control module 220). For example, control module 220 may include an analog-to-digital converter, configured to receive an analog signal from flow meter 208 and compute a flow rate based on the signal. In a further example, control module 220 may include a digital I/O interface, configured to receive a pulse signal from flow meter 208 and compute a flow rate based on the signal (e.g., frequency of pulses from a turbine meter).

Valve 211 is configured to provide a shut-off of flow to fill head 255 of filling system 250. In some embodiments, valve 211 is controlled by control module 220 (e.g., a programmable logic controller (PLC)). For example, valve 211 may include any suitable configuration of a valve seat (e.g., needle valve, ball valve, gate valve, or other suitable valve type), with the valve plunger coupled to an electronic solenoid controlled by control module 220. In some embodiments, valve 205 is configured to be "normally-closed" and is opened by control module 220 during filling. In an illustrative example, valve 211 may be similar to valve 205.

Pressure relief valve (PRV) 213 is configured to allow fluid to escape system 200, venting through optional muffler 214 to atmosphere. For example, pressure relief valve 213 may be controlled by control module 220 to open at a predetermined pressure, at a determined time, for a determined time interval, based on any other suitable criterion, or any combination thereof. In a further example, control module 220 may be configured to open pressure relief valve 213 after a filling process to reduce pressure in the fluid connections of system 200. Muffler 214 is configured to reduce fluid velocity (e.g., a high-speed jet from PRV 213), reduce pressure waves (e.g., acoustic noise), or both. Snubber 215 is configured to reduce pressure fluctuations (e.g., the amplitude of pressure waves) with the flow system. In some embodiments, for example, snubber 215 prevents or reduces fluid hammering, which can damage fluid conduits and components from pressure wave interactions. In an illustrative example, snubber 215 may include an expansion tank, a section of fluid conduit, a piston-style snubber (e.g., with variable volume and compression of gas such as $N_2$ or $CO_2$ in a gas section), any other suitable style of snubber, or any combination thereof. Opening and closing of valves 205 and 211, a valve of bottle assembly 299, or a combination thereof, may cause pressure waves in the fluid, and for which snubber 215 reduces the amplitude of the pressure waves.

Pressure transducer 212 is configured to sense fluid pressure at fill head 255 and provide an indication of the sensed pressure to control module 220. Pressure transducer 212 may include an absolute pressure sensor, a relative pressure sensor (e.g., indicating a "gage" pressure), a differential pressure sensor, a vacuum sensor, any other suitable sensor, or any combination thereof. For example, pressure transducer 212 may include a piezoelectric sensor, a resistive strain-gage-based sensor (e.g., a piezoresistive element and a bridge circuit), an electromagnetic sensor, a capacitive sensor (e.g., using a strain gage and bridge circuit), any other suitable principle of operation, or any combination thereof. In some embodiments, control module 220 provides power or excitation to pressure transducer 212 and receives a signal from pressure transducer 212 indicative of pressure. For example, control module 220 may provide a DC voltage to pressure transducer (e.g., 5 VDC, 24 VDC, 12 VDC, or other voltage). In a further example, pressure transducer 212 may provide an analog signal (e.g., 4-20 mA, 05 VDC, 1-5 VDC, or other range) indicative of pressure, a digital signal indicative of pressure (e.g., using CANbus, ModBus, 2-wire serial, or any other suitable interface or bus), any other suitable signal, or any combination thereof.

Components 201-208 and 210-215 may be coupled using any suitable fluid connections and conduits. For example, each component may include fluid ports (e.g., inlet ports, outlet ports, or other port) having any suitable connection type. Illustrative connection types include pipe thread (e.g., NPT), compression fittings for tubing (e.g., metal or non-metal tubing), flare fittings for tubing, hose fittings (e.g., barbed, flared, or compression fittings), straight-thread O-ring fittings (e.g., radial or face sealing), flanged connections (e.g., bolted flanges, with or without gaskets), CGA-type interfaces (e.g., CGA-320 for $CO_2$), quick-connect fittings, any other suitable connection types, or any suitable combination thereof. For example, pressure, temperature, and fluid compatibility considerations may constrain the type of fluid connection that is used. In an illustrative example, each of components 201-208 and 210-215 may have corresponding connection types, and one or more adapters is used to connect system-adjacent components. In a further illustrative example, fittings may include JIC 37° fittings, SAE 45°, fittings, NPT tapered fittings, or a combination thereof.

Control module 220 is configured to control aspects of system 200, receive information from sensors and other sources, manage electric power, communicate with external devices and network devices, interface with a user, identify fluid containers, and otherwise provide an automatic system for filling and dispensing fluid containers. Control module 220 may include, or be communicatively coupled to, an embedded computing system, a programmable logic controller, a central processing unit (CPU), a collection of control modules configured to communicate via a bus, a central processing unit, an analog-to-digital converter (ADC), an input/output (TO) interface (e.g., pins, connectors, terminals, headers, or any other suitable interface), memory storage, a communications interface, a sensor interface, payment processing module 222, user interface 221, electric power system 224, read/write system 225, switches (e.g., relays, contactors, transistors, or suitable switches having any suitable pole/throw count), any other suitable circuitry, any other suitable components, or any suitable combination thereof.

User interface 221 is configured to provide indications to a user and receive input from the user. User interface 221 may include a display screen, a touchscreen, a keypad, a touchpad, a speaker, a microphone, push buttons, LED indicators, any other suitable components, or any combination thereof. For example, user interface 221 may include a touchscreen configured to display information to a user and receive haptic feedback from the user (e.g., user selections or input of information).

Payment processing module 222 is configured to receive user-supplied payment with, for example, cash, credit, debit, gift card, value tokens of a digital wallet, digital cryptocurrency, any other suitable payment type, or any combination thereof. In some embodiments, payment processing module 222 includes a mechanism and port for receiving-reading-returning a payment card, receiving-returning cash, receiving-issuing a tag or receipt, managing other forms of payment, managing other forms of information exchange, or any suitable combination thereof. Payment processing module 222 may communicate with remote network devices such as, for example, secure payment processing facility, a remote database, a financial institution, any other suitable network entity, or any combination thereof, via telemetry control unit 223.

In some embodiments, control module 220 includes or is coupled to a network interface (e.g., telemetry control unit 223). To illustrate, telemetry control unit 223 may include a RJ45 port, a WiFi antennae, a fiber optic port (e.g., an LC-type, SC-type, or ST-type connector), any other suitable communications interface, or any combination thereof. For example, telemetry control unit 223 may include an RJ45 jack coupled to an ethernet controller, allowing control module 220 to communicate with devices connected to the internet (e.g., remote databases, user devices, host servers, cloud servers, or any other suitable devices), a local network, or both. In a further example, telemetry control unit 223 may include an antenna and a wireless network interface controller, allowing control module 220 to communicate with devices connected to the internet (e.g., remote databases, user devices, host servers, cloud servers, secure payment processing facility, or any other suitable devices), a local wireless network, or both.

Power system 224 is configured to provide electric power to control module 220 and subsystems thereof or coupled thereto. In some embodiments, power system 224 includes an interface to receive AC power from the grid (e.g., via a plug of any suitable amperage capacity, for single phase or three-phase power). In some embodiments, power system 224 includes an AC-DC converter, an AC-AC converter, a DC-DC converter, or a combination thereof. In some embodiments, power system 224 may receive and distribute AC power from the installation site (e.g., for powering subsystems of system 200), and generate and manage one or more DC buses for providing electric power to DC-based devices (e.g., for powering subsystems of system 200). For example, power system 224 may provide electric power to actuate pumps (e.g., transfer pump 207), valves (e.g., valves 205, 211, and 213), compressors (e.g., compressor 210), sensors (e.g., sensors 212, 251, and 252), bottle positioning actuators (e.g., mechanisms 256 and 257), flow meter 208, mechanisms of payment processing module 222, any other suitable actuated or transducer devices, or any combination thereof. Mechanism 256 is a gripping mechanism (a "gripper") configured to secure fluid container 299 when actuated. Mechanism 257 is a translating stage configured to move fluid container 299 in at least one direction (e.g., axial motion, radial motion, azimuthal motion/rotation). Fill head 255 may include a mechanism such as a gripper (e.g., an integrated sleeve-type gripper) configured to secure fill head 255 to bottle assembly 299 (e.g., by engaging a feature of a valve assembly of the bottle assembly 299) when actuated. In some embodiments, the mechanism of fill head 255 may engage and disengage bottle assembly 299 with, or alternately to, mechanism 256 (e.g., to prevent over-constraining or stressing bottle assembly 299). For example, in some embodiments, either the mechanism of fill head 255 or mechanism 256 grip bottle assembly 299 at any time. For example, in some embodiments, mechanism 256 may be integrated into fill head 255. The mechanism of fill head 255 and mechanism 256 may each include any suitable type of respective mechanism such as, for example, gripping members (e.g., finger-like members, cams, sleeve-actuated connector), a collar (e.g., a clamshell type clamping mechanism), any other suitable mechanism, or any combination thereof. In some embodiments, mechanism 257 is constrained to move only in the vertical direction (as illustrated), to position the bottle nearer or further from fill head 255.

Sterilization system 253 is included to sterilize fluid container 299, and more particularly to sterilize valve assembly 298. In some embodiments, the user inserts fluid container 299 into a filling station (e.g., mechanism 256 thereof), the filling station reads an identification tag of fluid container 299, and fluid container 299 is cleared to be filled. When the filling station clears payment from user, sterilization system 253 activates for a predetermined amount of time to sterilize valve assembly 298 on the top of fluid container 299. In some embodiments, fluid container 299 may be raised slightly upward toward sterilization system 253 to make sterilization more effective. For example, sterilization system 253 may include a UV-C light source.

Sensor 251 is configured to sense position information of fluid container 299. In some embodiments, sensor 251 includes an optical sensor. For example, sensor 251 may include a line of sight sensor including a photonic source and a detector. In a further example, sensor 251 may include a photonic source and a detector and control circuitry 220 may be configured to measure distance based on sensor 251 providing light incident on fluid container 299 and detecting reflected light from the surface of fluid container 299. In some embodiments, sensor 251 includes an image sensing sensor. For example, sensor 251 may detect light and control circuitry 220 may generate an image of fluid container 299 and determine position information or height information of fluid container 299 based on the image (e.g., image processing). In some embodiments, sensor 251 includes multiple sensors arranged around fluid container 299 and control circuitry 220 is configured to generate a full or partial three-dimensional image. In some embodiments, sensor 251 includes an image sensor configured to identify if there is an obstruction on the fluid container valve or otherwise if something is abnormal that would prevent filling.

Read/write system 225 is configured to read information from, or write information to, an electronic identifier of a fluid container (e.g., fluid container 299). In some embodiments, read/write system 225 may be coupled to read/write head 252, which may be configured to activate an electronic identifier such as a radio frequency identification (RFID) tag, and receive signals from the RFID tag. Read/write system 225 and read/write head 252 may be configured to read passive RFID tags (e.g., supply excitation), active RFID tags (e.g., that are powered internally), or both. An electronic identifier, such as electronic identifier 129 of FIG. 1, may store information including fluid container identification (e.g., a serial number), tare weight, capacity, life cycle state (e.g., creation date, expiration date, progress along usable lifetime), number of fillings, maximum pressure/temperature, compatible fluids, a registered user, preferred fill settings, any other properties or information about the fluid container, or any combination thereof. In some embodiments, a refillable fluid container includes an RFID tag affixed in any suitable way, such that the tag it is not removable and tamper resistant.

Sensor(s) 226 is configured to sense a property of the fluid at any suitable position in system 200, a property of leaked or vented fluid just outside of system 200, or a combination thereof. Sensor(s) 226 may include a temperature sensor, a pressure sensor, a concentration sensor, a level sensor, a sensor configured to sense any other suitable property of the fluid, or any combination thereof. For example, sensor(s) 226 may include a temperature sensor for an enclosure in which system 200 is installed. To illustrate, a temperature sensor may be arranged for sensing temperature inside the enclosure as well as one outside the enclosure (e.g., an outside air temperature). In a further example, sensor(s) 226 may include a pressure sensor configured to sense fluid pressure at or near supply tank 201 (e.g., upstream of transfer pump 207). In a further example, sensor(s) 226 may include a fluid concentration sensor (e.g., chemical, electrochemical, or optical) in an enclosure in which system 200 is installed. To illustrate, a $CO_2$ concentration sensor may be arranged for sensing $CO_2$ inside the enclosure as well as outside the enclosure. In a further example, sensor(s) 226 may include a level sensor of any suitable type (e.g., capacitive, optical, electromechanical, magnetic, or any other suitable type of level sensor).

Temperature control system 227 is configured to affect operation of system 200 based on one or more temperatures. In some embodiments, temperature control system 227 is configured to heat, to cool, or both, one or more components or fluid lines to maintain, increase, decrease, or otherwise affect a fluid temperature. For example, temperature control system 227 may be configured to sense a fluid-temperature and adjust operation of transfer pump 207 based on the fluid temperature. In some embodiments, temperature control system 227 includes a thermostatic device, an electric heater (e.g., a heating jacket), a refrigeration-based cooling system (e.g., a cooling jacket), any other suitable devices or components, or any combination thereof.

In some embodiments temperature control system 227 is configured to detect the temperature inside the enclosure, and by controlling the temperature inside the enclosure is able to control the pressure in the supply tank and fluid lines. For example, the lower the temperature in the enclosure, the lower the fluid pressure in the supply tank and fluid lines. The higher the temperature in the enclosure, the higher the pressure in the supply tank and fluid lines. The ability to control the pressure in the system is provided by control of the operation of the transfer pump. To illustrate, by controlling an environmental temperature in the enclosure, temperatures of the fluid lines, supply tank and all components are inside the enclosure are controlled as well (e.g., even if indirectly). In some embodiments, temperature control system 227 is for systems (e.g., filling stations) using high pressure cylinders, as they are sensitive to temperature fluctuations and may need to be maintained at a constant temperature for safety and operational reasons. Temperature control system 227 may be configured to maintain the inside temperature of the enclosure at 70° F., thereby maintaining the operational pressure at 838 psi (57.8 bar) upstream of the transfer pump.

Power backup 228 is configured to provide electric power in the event of a power supply failure (e.g., a power outage). Electric power can be interrupted from a grid failure, a blown fuse, a tripped breaker, damaged conductors, or other events, and power backup 228 allows for continued operation, safe shutdown, system monitoring, any other actions, or any combination thereof. For example, power backup 228 may include a rechargeable battery, a replaceable battery, any other suitable battery, any other suitable energy storage device, or any combination thereof. To illustrate, electric power backup 228 may include an uninterruptable power supply (UPS).

Filling station 250 is configured to secure and position a fluid container for filling, engage the fluid container with the fluid conduit, receive pressurized fluid, provide the pressurized fluid to the fluid container, disengage the fluid container from the fluid system, and release and position the fluid container for removal (e.g., by a user). Scale 291 is configured to sense the weight of fluid container 299. For example, scale 291 may be coupled to control circuitry 220, which may be configured to determine a tare weight for fluid container 299. Ina further example, control circuitry may receive signals from scale 291 during a filling process, and determine how much fluid has been delivered to fluid container 299 based on a change in weight of fluid container 299.

Although not shown, in some embodiments, system 200 includes one or more heaters (e.g., electric heaters). For example, in some embodiments, system 200 includes a thermostatic-controlled electric heater jacket configured to provide heat to supply tank 201, fluid plumbing, any other suitable components, or any combination thereof. For example, the electric heater jacket may be used to control the pressure in the supply tank 201, which in turn can be used to affect flow rate. In some embodiments, system 200 includes one or more valve heaters configured to prevent a fluid line from freezing. In some embodiments, an electric heater may be used in combination with ambient temperature to control fluid delivery to a container and prevent the fluid from freezing. In some embodiments, an electric heater is used together with pump speed control to provide a desired fluid flow rate, pressure, or other flow characteristic.

Figure 3:
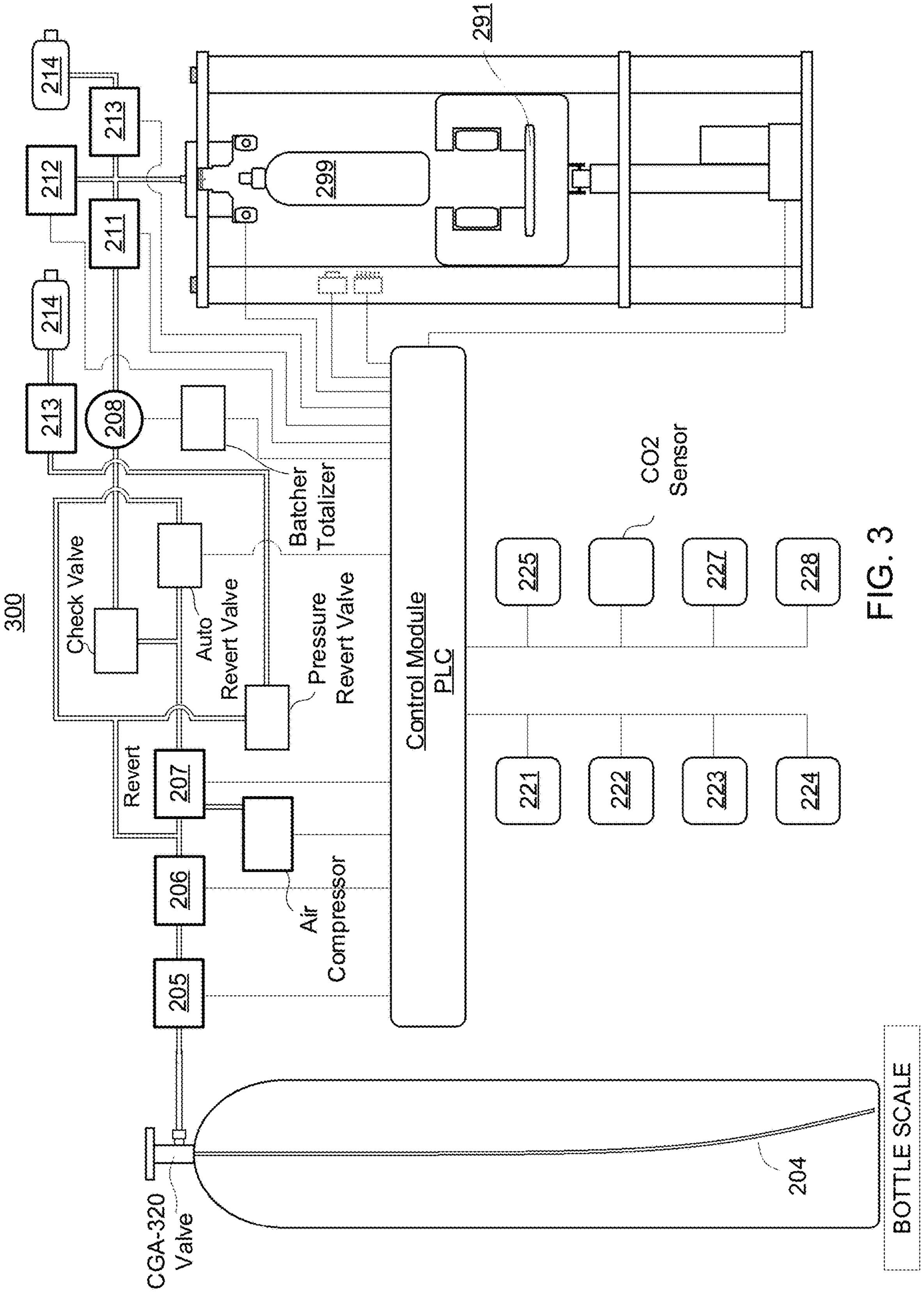
FIG. 3 shows a block diagram of an illustrative system for managing bottle filling with a revert system and high-pressure cylinder, in accordance with some embodiments of the present disclosure.

FIG. 3 shows a block diagram of illustrative system 300 for managing bottle filling with a revert system and high-pressure cylinder, in accordance with some embodiments of the present disclosure. While system 300 is similar to system 200 of FIGS. 2A-2C, the revert system and high-pressure cylinder are different. The $CO_2$ supply cylinder is configured to store $CO_2$ under high pressure, without venting. In some embodiments, the $CO_2$ supply cylinder is a 50 lbs or 100 lbs cylinder. The revert system includes an auto revert valve, controlled by the control module PLC (e.g., which may be implemented as control circuitry of any suitable type). When opened, the auto revert valve allows pressurized fluid from the outlet of the transfer pump to recirculate to the inlet of the transfer pump, thereby increasing the fluid pressure at the outlet of the transfer pump. For example, revert may be used to supplement driving energy provided to the transfer pump to achieve higher supply pressures for the fill head. The pressure relief valves (e.g., mechanical valves with pre-set cracking pressures) in series downstream of the revert line are used to limit the pressure in the respective fluid lines. If the auto revert valve is not opened, system 300 may operate similarly to system 200, albeit possibly at greater fluid pressures due to the high-pressure cylinder. In some embodiments, as illustrated, system 300 includes a bottle scale for sensing the weight of the high-pressure cylinder. For example, as fluid flows out of the high-pressure cylinder, the weight decreases and may be sensed by the bottle scale. In some embodiments, the bottle scale is coupled the control module (e.g., control circuitry), which may be configured to monitor the weight of the high-pressure cylinder. In some embodiments, the bottle scale is used to determine when to replace the high-pressure cylinder, for example. In some embodiments, the bottle scale is used to determine how much fluid has been provided during one or more filling/refilling processes, for example.

Figure 4:
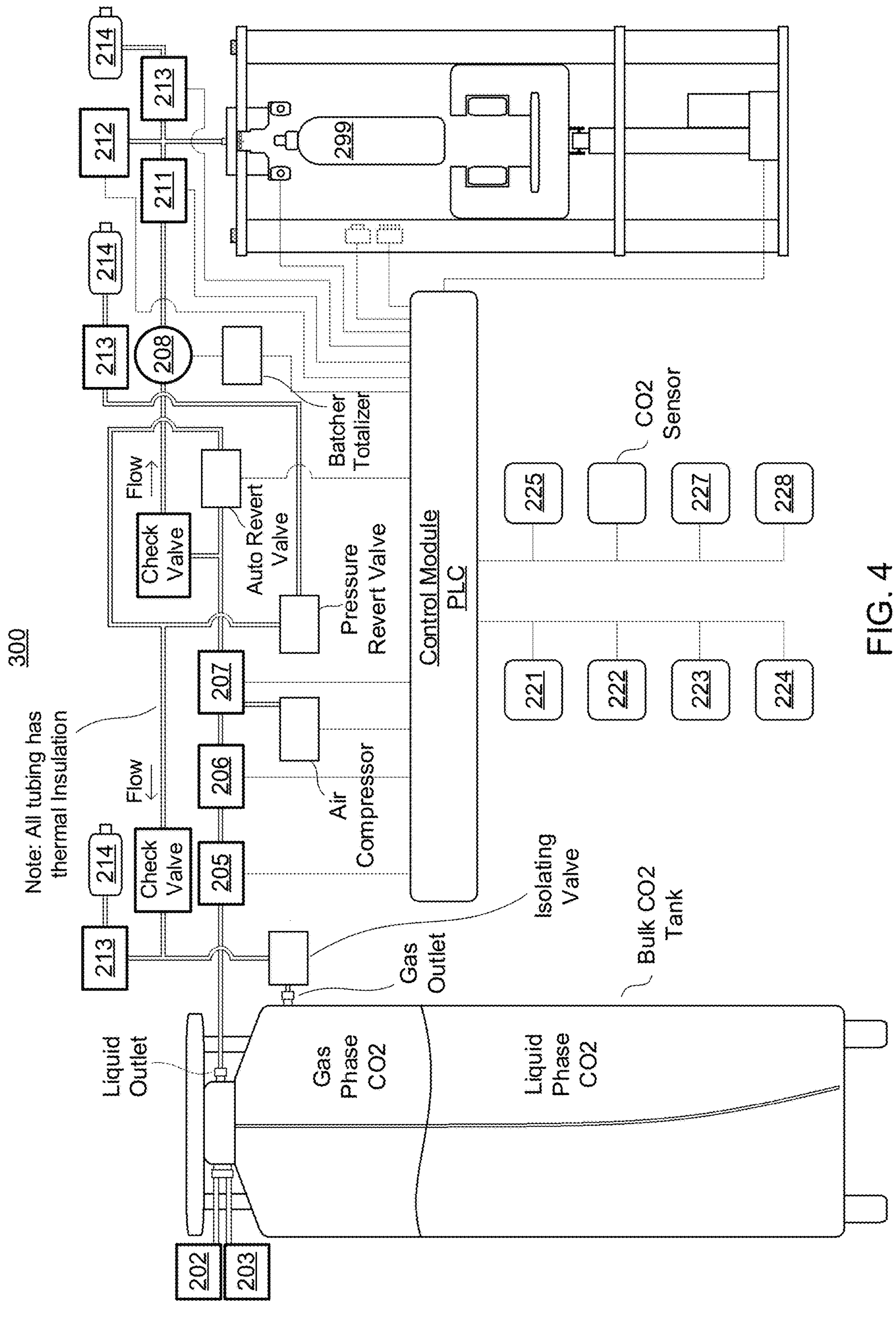
FIG. 4 shows a block diagram of an illustrative system for managing bottle filling with a revert system and low-pressure tank, in accordance with some embodiments of the present disclosure.

FIG. 4 shows a block diagram of illustrative system 400 for managing bottle filling with a revert system and low-pressure tank, in accordance with some embodiments of the present disclosure. While system 400 is similar to system 400 of FIGS. 2A-2C, the revert system presents a difference. The revert system includes an auto revert valve, controlled by the control module PLC (e.g., which may be implemented as control circuitry of any suitable type). When opened, the auto revert valve allows pressurized fluid from the outlet of the transfer pump to recirculate to the supply tank through the check valve (e.g., a one-way valve oriented towards the supply tank) and the isolation valve (e.g., having a pre-set cracking pressure), thereby increasing the fluid pressure in the supply tank. For example, revert may be used to supplement driving energy provided to the transfer pump to achieve higher supply pressures for the fill head. The pressure relief valves (e.g., mechanical valves with pre-set cracking pressures) downstream of the auto revert valve are used to limit the pressure in the respective fluid lines. If the auto revert valve is not opened, system 400 may operate similarly to system 200.

Figure 5:
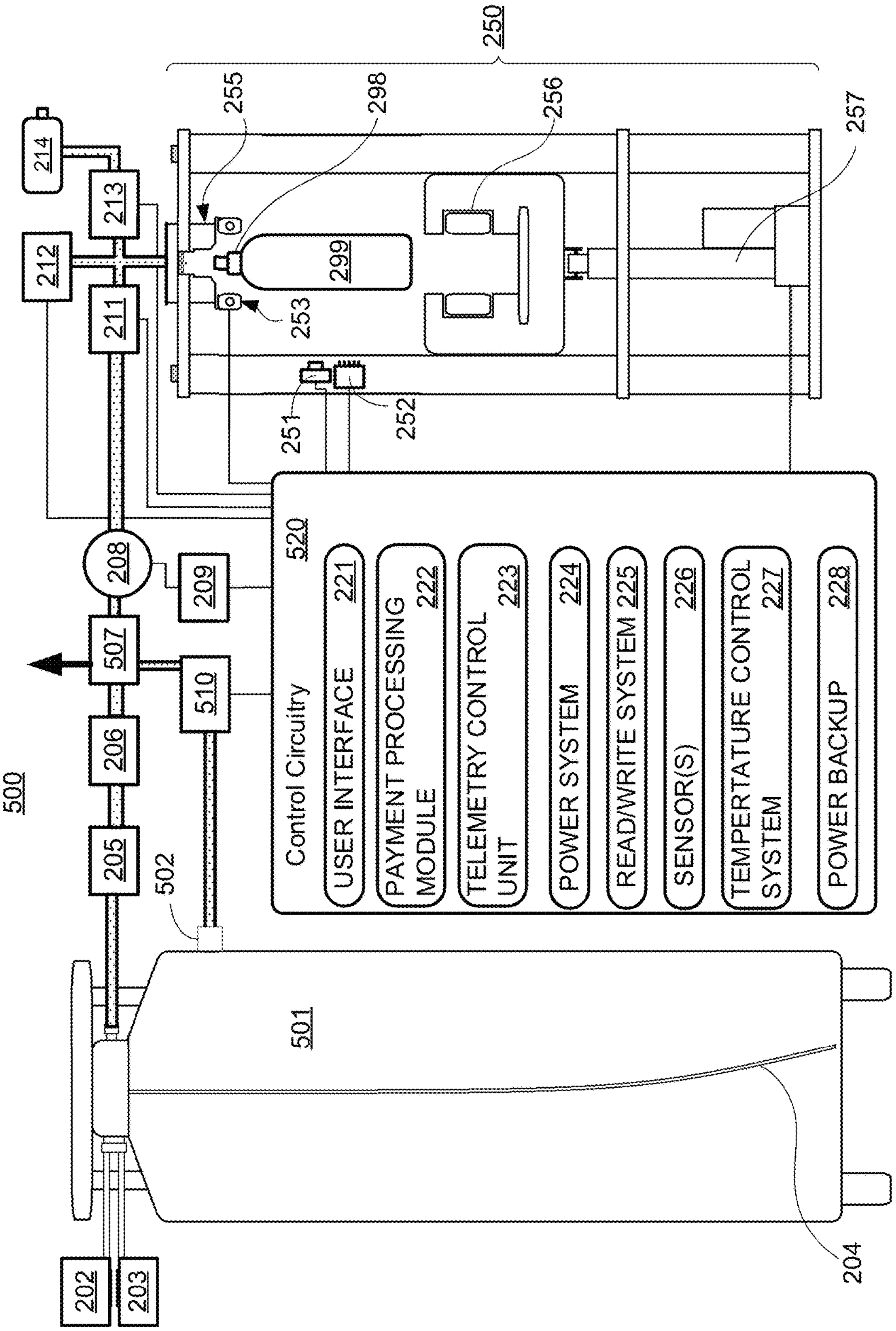
FIG. 5 shows a block diagram of an illustrative system for managing bottle filling, using a process fluid to drive a transfer pump, in accordance with some embodiments of the present disclosure.

FIG. 5 shows a block diagram of illustrative system 500 for managing bottle filling, using process fluid to drive transfer pump 507, in accordance with some embodiments of the present disclosure. As illustrated, system 500 is similar to system 200 of FIGS. 2-4, with the energy supply of the transfer pump being process fluid in system 500 rather than a separate compressor acting on a separate gas stream. It will be understood that any suitable components of system 200 may be used in system 500, and that some components may be different. For example, transfer pump 507 of system 500 may be the same as, or different from, transfer pump 207 of system 200. In a further example, control circuitry 520 of system 500 may be the same as, or different from, control circuitry 220 of system 200. In an illustrative example, the use of transfer pump 507 may allow fewer components (e.g., no separate gas compressor) or fewer moving parts to be required (e.g., thus reducing maintenance requirements). In a further illustrative example, transfer pump 507 may be driven by a separate tank of compressed gas (e.g., not the fluid of supply tank 507).

Supply tank 501 is configured to store a fluid having a liquid phase and a gaseous phase such as, for example, carbon dioxide. Siphon tube 204 is configured to provide a flow path for the liquid phase (e.g., when the liquid level is above the lower port of siphon tube 204) to flow through valve 205, filter 206, and transfer pump 507 and on to filling head 255. Port 502 is configured to allow the gaseous phase to flow to valve 510, which is controlled by control circuitry 520, to the driving side of transfer pump 507. The pressure drop of the gaseous phase across the drive side provides the energy to transfer pump 507 to pump the liquid phase. The gaseous phase and liquid phase do not mix at transfer pump 507, and no external gas stream is required to provide the energy. The gaseous phase that flows through the drive side of transfer pump 507 is at a lower pressure than the fluid in supply tank 201, and may be vented, collected, or otherwise managed. For example, the gaseous phase that flows through the drive side of transfer pump 507 may be in the range 125-140 psi (8.6-9.7 bar) to drive transfer pump 507. In a further example, a pressure regulator may be included (e.g., in-line with valve 510) to drop the pressure from supply tank 501 (e.g., as it may be at considerably higher pressure). The fluid in supply tank 501 is at a nominally constant pressure spatially in that the gaseous phase and liquid phase in supply tank 501 are at the same pressure (e.g., aside from relatively insignificant flow-induced static pressure gradients). In some embodiments, port 502 is positioned near to fill ports and vent ports. Port 502 may be positioned at any suitable location along supply tank 501 (e.g., generally nearer the top of supply tank 501 so that the liquid level is beneath port 502.

Figure 8:
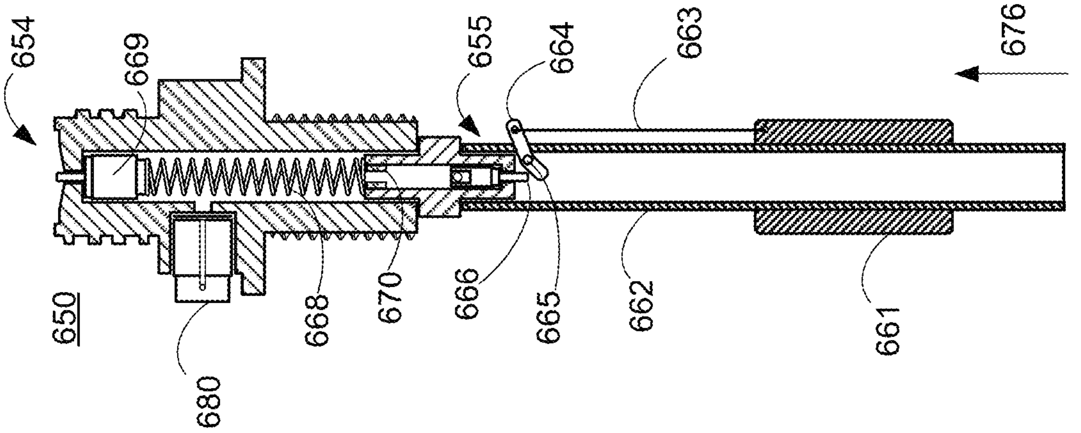
FIG. 8 shows a side cross-sectional view of the illustrative valve of FIG. 6, in a closed position, in accordance with some embodiments of the present disclosure.
Figure 7:
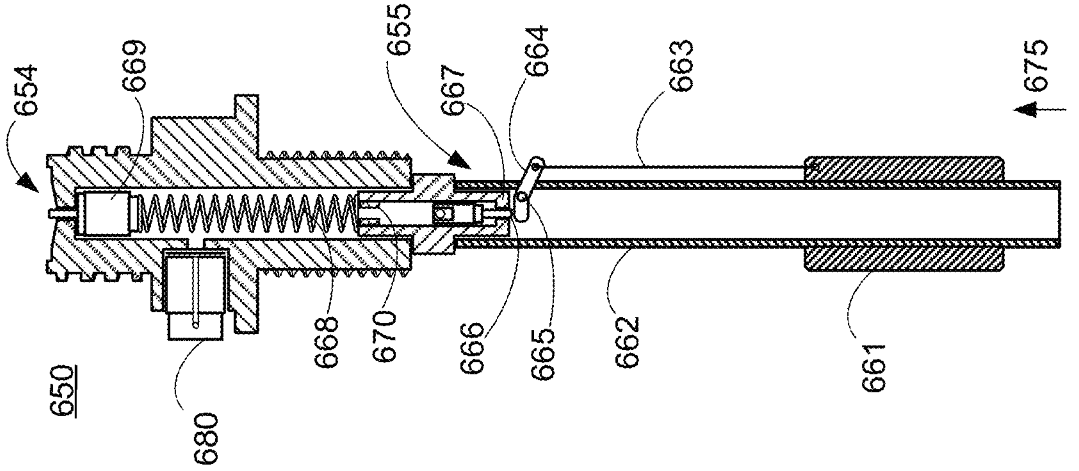
FIG. 7 shows a side cross-sectional view of the illustrative valve of FIG. 6, in an open position, in accordance with some embodiments of the present disclosure.
Figure 6:
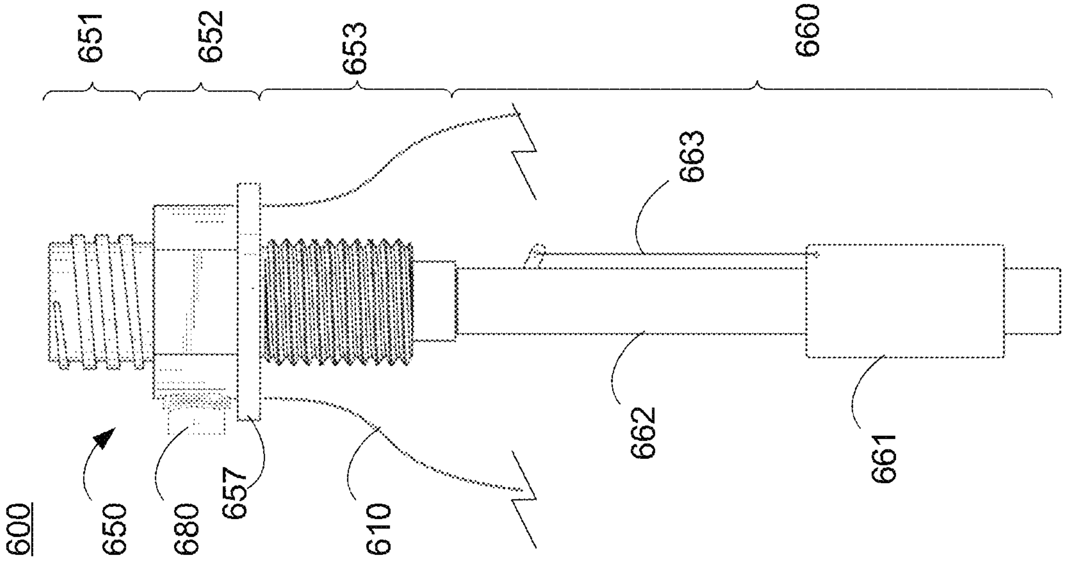
FIG. 6 shows a side view of an illustrative bottle assembly, with a valve having a float mechanism, in accordance with some embodiments of the present disclosure.
Figure 11:
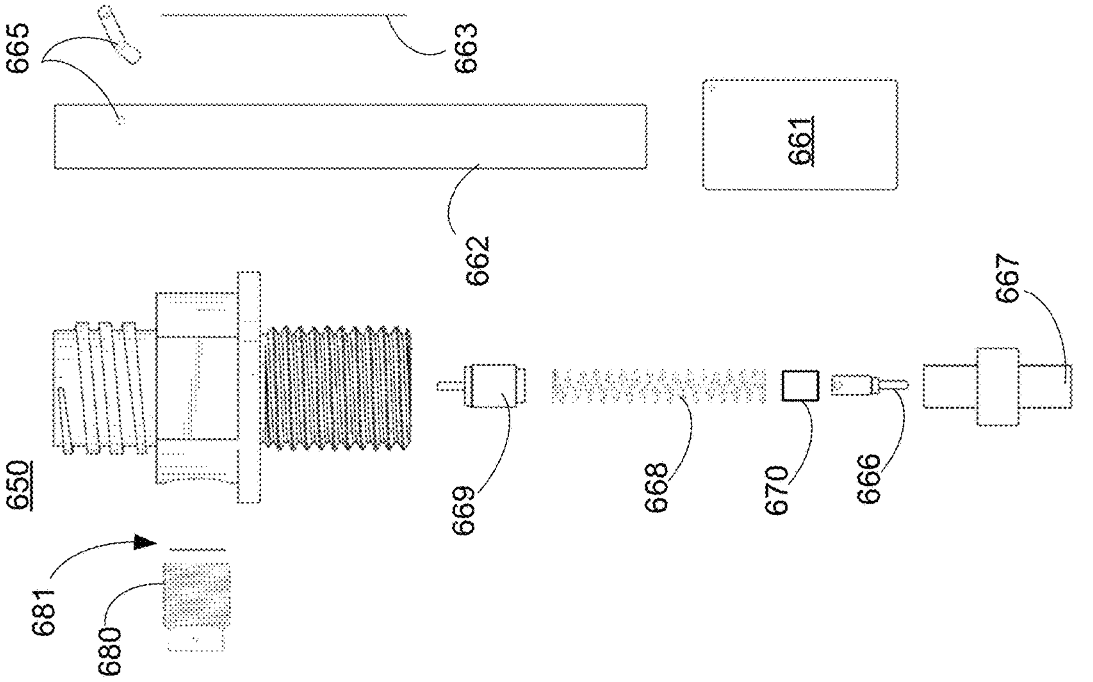
FIG. 11 shows a side exploded view of the float mechanism of the illustrative valve of FIG. 6, in accordance with some embodiments of the present disclosure.
Figure 10:
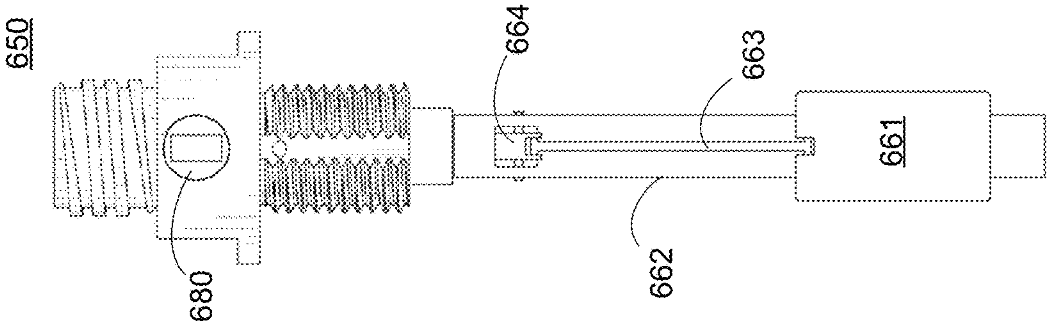
FIG. 10 shows a front view of the illustrative valve of FIG. 6, in the open position, in accordance with some embodiments of the present disclosure.
Figure 9:
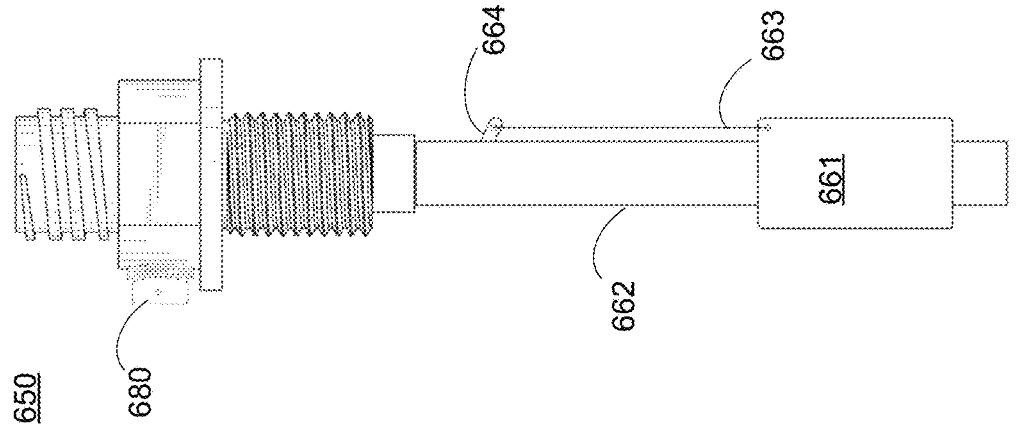
FIG. 9 shows a side view of the illustrative valve of FIG. 6, in an open position, in accordance with some embodiments of the present disclosure.

FIG. 6 shows a side view of illustrative bottle assembly 600, with valve assembly 650 having float mechanism 660, in accordance with some embodiments of the present disclosure. FIG. 7 shows a side cross-sectional view of illustrative valve assembly 650 of FIG. 6, in an open position, in accordance with some embodiments of the present disclosure. FIG. 8 shows a side cross-sectional view of illustrative valve assembly 650 of FIG. 6, in a closed position, in accordance with some embodiments of the present disclosure. FIG. 9 shows a side view of illustrative valve assembly 650 of FIG. 6, in an open position, in accordance with some embodiments of the present disclosure. FIG. 10 shows a front view of illustrative valve assembly 650 of FIG. 6, in the open position, in accordance with some embodiments of the present disclosure. FIG. 11 shows a side exploded view of float mechanism 660 of the illustrative valve of FIG. 6, in accordance with some embodiments of the present disclosure. Valve assembly 650 includes a valve body (e.g., sections 651, 652, and 653), a valve pin (e.g., valve pin 655 shown in FIGS. 7-8), float mechanism 660, and relief valve 680 (e.g., with burst disk 681 as illustrated).

As illustrated, valve assembly 650 is engaged with bottle 610 via threaded section 653 (e.g., valve assembly 650 has external threads in threaded section 653). Also, as illustrated, lip 657 of section 652 interfaces with an axial end of bottle 610 (e.g., optionally with a seal, gasket or O-ring). For reference, as illustrated in FIG. 6, the axial direction is aligned vertically, the radial direction is oriented horizontally, and the azimuthal direction is directed around the axial direction (e.g., cylindrical coordinates naturally describe the refillable bottle geometry). Relief valve 680 is engaged with a corresponding port of section 652. For example, relief valve 680 may include external pipe threads (e.g., male NPT) which may engage with a female pipe thread of section 652. In a further example, relief valve 680 may engage with section 652 by a straight thread interface with a radially-sealing or axially-sealing O-ring. Section 651, as illustrated, includes external threads configured for engaging a filling head (e.g., of a filling station), a dispensing head (e.g., of a consumer beverage device), or both. In an illustrative example, sections 651, 652, and 653 of valve assembly 650 may be made primarily of brass. Structural portions and threads of valve assembly 650 may be brass.

Valve assembly 650 includes two valves, valve 654 and 655. In some embodiments, valve 654 is configured to engage with a fill head. For example, valve 654 may be configured to have a cracking pressure, such that when fluid pressure is supplied, valve member 669 unseals from a corresponding valve seat. In a further example, engaging the bottle assembly to a fill head may open valve 654 by depressing valve member 669 (e.g., unsealing valve member 669 from the corresponding valve seat). In some embodiments, valve 655 is actuated by fluid pressure and float mechanism 660. For example, valve pin 666 may be pushed towards valve seat 667 by fluid pressure upstream. The position of float 661 causes valve pin 666 to unseal or seal from valve seat 667 based on fluid level in bottle assembly 600, as described below. Retainer 670 is included in some embodiments to retain and limit travel of valve pin 666. For example, retainer 670 may be screwed into section 653. In some embodiments, a spring is included and arranged in between retainer 670 and valve pin 666 to apply an axial force on valve pin 666 (e.g., further limiting travel).

Section 651 is configured to engage with a filling head or dispensing head, allowing fluid to enter or leave the inner volume of bottle 610. Section 651 includes a valve seat against which valve member 669 is configured seal and unseal. Valve member 669 may be similar to, or different from, valve pin 666. In some embodiments, when bottle assembly 600 is engaged to a filling head, for example, a filling nozzle may engage with valve member 669, pushing is axially downwards, as illustrated, thus causing valve member 669 to unseal from the valve seat of section 651. For example, valve member 669 may be physically pushed down by a male pin in the filling head as it engages with the filling head. In some embodiments, when bottle assembly 600 is engaged to a filling head, for example, pressure of fluid in a filling nozzle may push valve member 669 axially downwards, as illustrated, thus causing valve member 669 to unseal from the valve seat of section 651. This unsealing allows the fluid to flow from the filling head between valve member 669 and the valve seat to the volume between valve member 669 and valve pin 666. If float mechanism 660 is in the open configuration (e.g., no appreciable buoyant forces acting by liquid in bottle 610 onto float 661), the fluid may then flow past valve pin 666 and valve seat 667 into the inner volume of bottle 610. Spring 668 is in compression, applying axial force on valve member 669 to seal it against the valve seat of section 651. Spring 668 may be compressed by a filling nozzle, pressure from the fluid in the fill head, or both, to allow valve member 669 to unseal from the valve seat of section 651 and allow fluid to flow in or out of bottle 610.

Section 653 and float mechanism 660 are configured to interface to bottle 610 and the inner volume thereof. Float mechanism 660, as illustrated, is integrated as part of valve assembly 650. Accordingly, float mechanism 660 is preferably sufficiently compact to fit into bottle 610 from the axial end (i.e., the top of bottle 610 as illustrated). Further details of float mechanism 660 are illustrated in FIGS. 7-8 and FIGS. 10-11. Float mechanism 660 includes float 661 configured to move in the axial direction along structural member 662. Float 661 is affixed to linkage 663 such that both move axially substantially together. Float 661 has a density (e.g., total mass per total volume) less than that of the liquid phase of the fluid in the bottle, such that buoyant forces from the liquid act on float 661. For example, as illustrated, linkage 663 may have slight off-axis motion but primarily translates along the axial direction. Linkage 663 is affixed to linkage 664, which is constrained about hinge 665. Linkage 664 also engages with valve pin 666, sealing and unsealing valve pin 666 against valve seat 667. Although illustrated as a pin valve, any suitable valve geometry may be used in accordance with present disclosure. Accordingly, the mechanism including float 661, linkage 663, linkage 664, and hinge 665 may be modified in any suitable way or be replaced by any suitable mechanism coupling float 661 to a valve member (e.g., valve pin 666 in the illustrated example). In some embodiments, valve assembly 650 includes a guide body (e.g., structural member 662) arranged along an axis. In some such embodiments, float 661 includes an annular cross section surrounding the axis, such that the guide body constrains the float to move along the axis. In some embodiments, for example, the axis is the same as, or parallel to, an axis along which valve pin 666 is configured to move.

In an illustrative example, FIG. 7 shows valve pin 666 unsealed from valve seat 667, allowing fluid flow into bottle 610 (not shown in FIG. 7). Although not shown in FIG. 7, the liquid level in bottle 610 is such that float 661 does not experience buoyant affects, and accordingly float 661 is at position 675. FIG. 8 shows valve assembly 650 after sufficient filling that the liquid level in bottle 610 (not shown) imparts a buoyant force onto float 661 raising float 661 to position 676, which causes valve pin 666 to seal against valve seat 667 (e.g., via the action of linkages 663 and 664) and cease fluid flow into bottle 610.

In some embodiments, the inner diameter of the bottle port includes a cylindrical shape (e.g., corresponding to section 653 of valve assembly 650). In some embodiments, float 661 is configured to, during operation, stay within an extension of the cylindrical shape. For example, as illustrated in FIG. 6, float 661 is able to fit through the mouth of bottle 610, and remains within the diameter of the port of bottle 610. In some embodiments, although not shown, float 661 includes a petal or umbrella structure that can extend radially outward from the solid portion of the float. In some embodiments, the increased volume or reduced density helps to increase buoyant effects. In some embodiments, the increased surface area helps to increase drag or surface tension effects, to dampen or otherwise effect buoyant effects. The structure is configured to help prevent fluid from splashing above the float, provide the float with more buoyancy, or both. For example, the bottom of the float may include hinged flaps that are biased outward via springs, but that can be folder down for insertion into the port of the bottle.

FIGS. 12-16 illustrate arrangements including a bottle gripping mechanism configured to position a bottle assembly for filling, use, or both.

Figure 12:
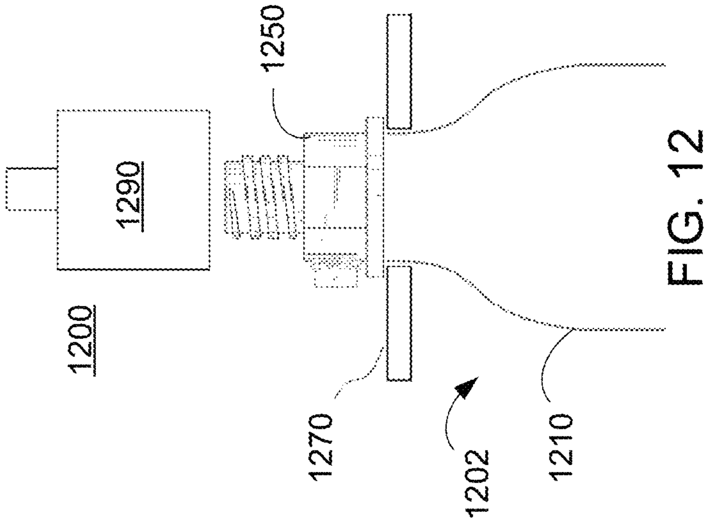
FIG. 12 shows a side view of an illustrative arrangement for gripping a bottle assembly, in an unsecured position, in accordance with some embodiments of the present disclosure.
Figure 13:
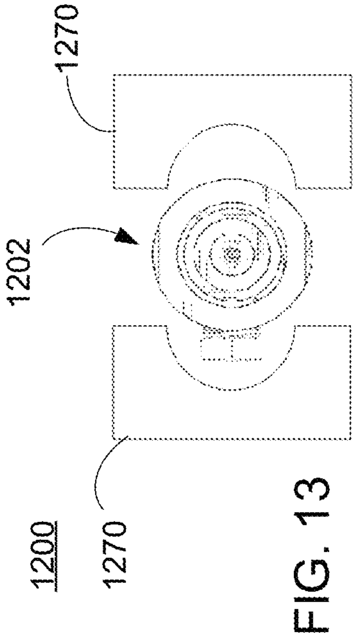
FIG. 13 shows a top view of the illustrative arrangement of FIG. 12, in the unsecured position, in accordance with some embodiments of the present disclosure.

FIG. 12 shows a side view of illustrative arrangement 1200 for gripping bottle assembly 1202, in an unsecured position, in accordance with some embodiments of the present disclosure. FIG. 13 shows a top view of illustrative arrangement 1200 of FIG. 12, in the unsecured position, in accordance with some embodiments of the present disclosure. Bottle assembly 1202 includes bottle 1210 and valve 1250.

Bottle assembly 1202 includes bottle 1210 and valve 1250. Arrangement 1200 represents, for example, bottle assembly 1202 placed for filling by a user onto a fill interface. Bottle grippers 1270 are not engaged with bottle assembly 1202, and filling head 1290 is not engaged with bottle assembly 1202 in arrangement 1200.

Figure 14:
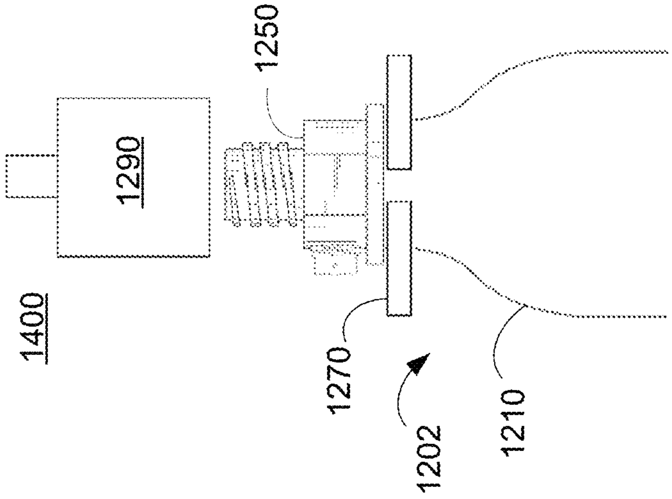
FIG. 14 shows a side view of an illustrative arrangement for gripping a bottle assembly, in a secured position, in accordance with some embodiments of the present disclosure.
Figure 15:
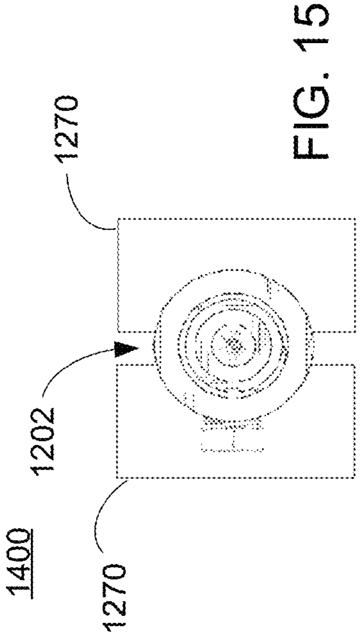
FIG. 15 shows a top view of the illustrative arrangement of FIG. 14, in the secured position, in accordance with some embodiments of the present disclosure.

FIG. 14 shows a side view of illustrative arrangement 1400, with bottle assembly 1202 in a secured position, in accordance with some embodiments of the present disclosure. FIG. 15 shows a top view of illustrative arrangement 1400 of FIG. 14, in the secured position, in accordance with some embodiments of the present disclosure. Arrangement 1400 is achieved, for example, by bottle gripper 1270 in arrangement 1200 engaging bottle assembly 1202. As illustrated, bottle grippers 1270 are configured to move radially inwards relative to bottle 1210 (e.g., bottle gripper 1270 may, but need not, apply a compressive force on the neck of bottle 1210). Friction holds bottle assembly 1202 in place relative to bottle grippers 1270 when bottle grippers 1270 are engaged. To illustrate, in arrangement 1400, bottle assembly 1202 is constrained from moving radially (e.g., by a normal force), axially (e.g., by a friction force and normal force acting on the lip of valve 1250), or azimuthally (e.g., by a friction force) relative to bottle grippers 1270, and accordingly bottle grippers 1270 may be used to position bottle assembly 1202.

Figure 16:
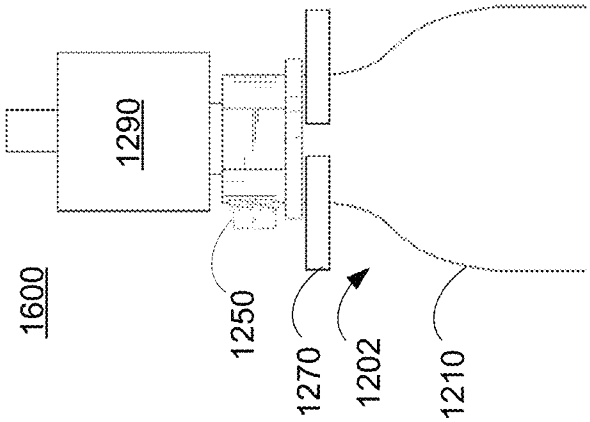
FIG. 16 shows a side view of an illustrative arrangement, in a secured position for filling, in accordance with some embodiments of the present disclosure.

FIG. 16 shows a side view of illustrative arrangement 1600, in a secured position for filling, in accordance with some embodiments of the present disclosure. Arrangement 1600 may be achieved by bottle grippers 1270, which are engaged with bottle assembly 1202, moving axially towards filling head 1290 to engage filling head 1290 with valve 1250. As illustrated, valve 1250 includes a lip (e.g., similar to lip 657 of section 652 of valve assembly 650 of FIGS. 6-11), against which bottle grippers 1270 may engage and apply force to position bottle assembly 1202.

In an illustrative example, bottle grippers 1270 may be configured to, when engaged with bottle assembly 1202, position bottle assembly 1202 axially, radially, azimuthally, or a combination thereof to engage with filling head 1290. In some embodiments, bottle assembly 1202 includes an identification tag, and bottle grippers 1270 may be configured to rotate bottle assembly 1202 to an angular position where the identification tag can be more easily accessed (e.g., read from, or written to). Further, bottle grippers 1270 may be configured to move bottle assembly 1202 radially so that valve 1250 aligns radially with filling head 1290 (e.g., the filling nozzle may be relatively small, and alignment may prevent damage or leakage). In some embodiments, grippers 1270 are actuated by a control system (e.g., not user actuated), which actuates grippers 1270 at a suitable time, via motor, linear actuator or other suitable actuator, as part of a filling process.

In an illustrative example, wherein a bottle assembly is placed in a home carbonation device, a user may place bottle assembly 1202 into the device. Bottle grippers close onto the bottle assembly to secure it, and then lift the bottle assembly to engage with a dispensing head. In some embodiments, a locking or latching mechanism may be used to secure the bottle assembly against the gas dispensing head (e.g., to ensure the bottle assembly does not loosen against the dispensing head, or otherwise move and become unsafe). When secured against the dispensing head, the home carbonation device may begin allowing gas in the bottle assembly to flow and carbonate beverages for a user. In some embodiments, for example, the bottle gripper and lift system may include a user-operated lever or other mechanism. For example, gripping and lifting may be performed in a single motion, process, or by a single mechanism. In a further example, the user arranges the bottle assembly into a countertop beverage machine and pushes a lever down, which will close the grippers around the bottle and lift the bottle into fluid connection with the countertop beverage systems gas dispensing head (e.g., a fill head), thus locking the bottle into place. A home carbonation device may include one, or more than one filling head, in which one filling head is for the fluid, and additional filling heads may be for beverage liquid, flavoring, or other ingredients.

In an illustrative example, wherein a bottle assembly is placed in a fill interface of a filling station, a user may place bottle assembly 1202 at the fill interface. Bottle grippers close onto the bottle assembly to secure it, and then lift the bottle assembly to engage with a filling head (e.g., after bottle identification or other pre-filling actions). In some embodiments, a locking or latching mechanism may be used to secure the bottle assembly against the filling head (e.g., to ensure the bottle assembly does not loosen against the filling head, or otherwise move). When secured against the dispensing head, the filling station may begin supplying fluid (e.g., in a liquid phase) to the bottle assembly until filled (e.g., as indicated by control circuitry or a float mechanism coupled to a valve of the bottle assembly). The user may then take the filled bottle assembly (e.g., after the bottle grippers disengage the bottle assembly from the filling head).

Figure 19:
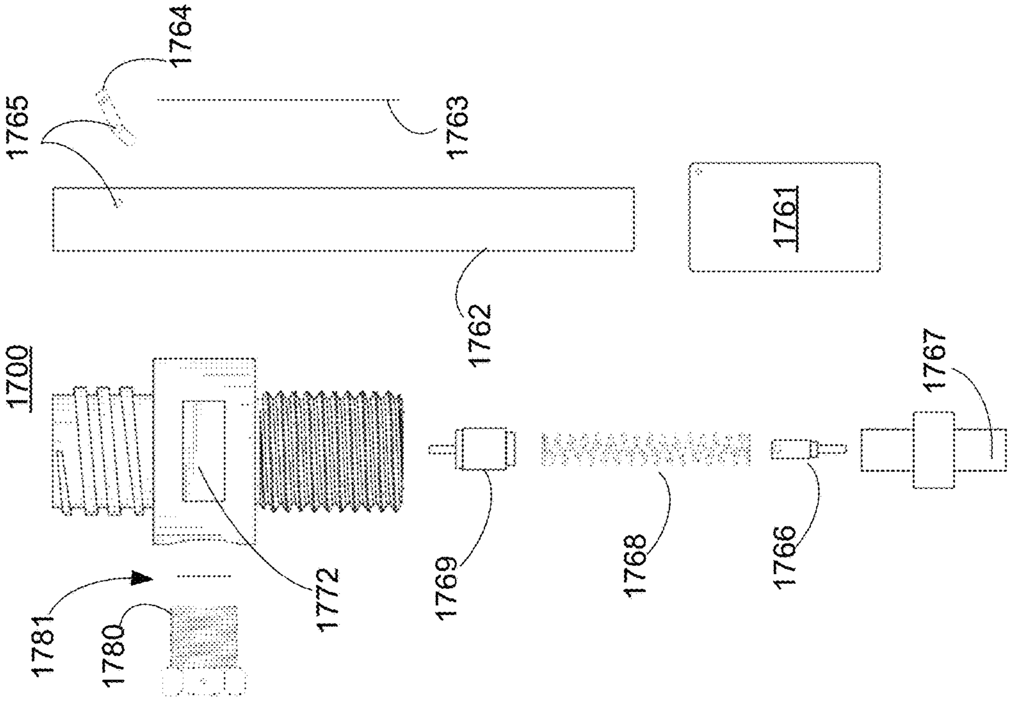
FIG. 19 shows a side exploded view of the illustrative valve of FIG. 17, in accordance with some embodiments of the present disclosure.
Figure 18:
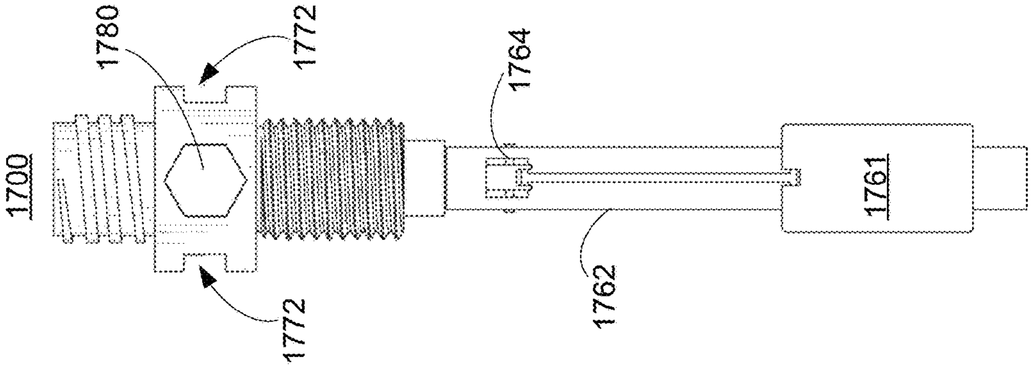
FIG. 18 shows a front view of the illustrative valve of FIG. 17, in an open position, in accordance with some embodiments of the present disclosure.
Figure 17:
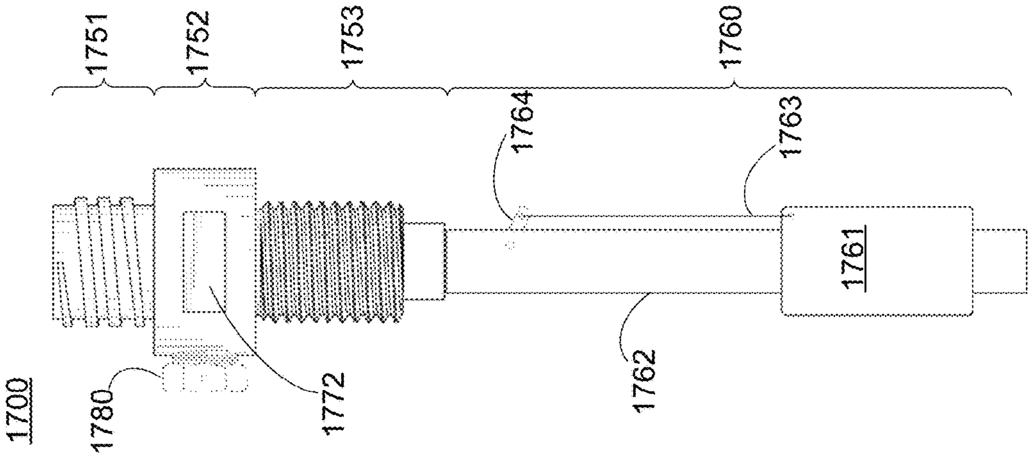
FIG. 17 shows a side view of an illustrative valve having recesses and a float mechanism, in accordance with some embodiments of the present disclosure.

FIG. 17 shows a side view of illustrative valve 1700 having recesses 1772 and a float mechanism 1760, in accordance with some embodiments of the present disclosure. FIG. 18 shows a front view of illustrative valve 1700 of FIG. 17, in an open position, in accordance with some embodiments of the present disclosure. FIG. 19 shows a side exploded view of illustrative valve 1700 of FIG. 17, in accordance with some embodiments of the present disclosure. Valve 1700 includes a valve body (e.g., sections 1751, 1752, and 1753), a first valve mechanism (e.g., valve pin 1766 shown in FIG. 19), a second valve mechanism (e.g., valve member 1769 shown in FIG. 19), grooves 1772, float mechanism 1760, and relief valve 1780.

As illustrated, valve 1700 is configured to be engaged with a bottle (not shown) via threaded section 1753 (e.g., valve 1700 has external threads in threaded section 1753). Section 1752, as illustrated, interfaces with an axial end of the bottle (e.g., optionally with a seal, gasket or O-ring). Relief valve 1780 is engaged with a corresponding port of section 1752, to secure burst disk 1781. For example, relief valve 1780 may include external pipe threads (e.g., male NPT) which may engage with a female pipe thread of section 1752. In a further example, relief valve 1780 may engage with section 1752 by a straight thread interface with a radially-sealing or axially-sealing O-ring. In a further example, burst disk 1781 may have an associated burst pressure (e.g., 3000 psi or 206.8 bar in some embodiments), and may be held in place by relief valve 1780 being screwed into threads of section 1752. Section 1751, as illustrated, includes external threads configured for engaging a filling head (e.g., of a filling station), a dispensing head (e.g., of a consumer beverage device), or both. In an illustrative example, sections 1751, 1752, and 1753 of valve 1700 may be made primarily of brass, stainless steel, any other suitable material, or any combination thereof. Structural portions and threads of valve 1700 may be made of any suitable material (e.g., brass, stainless steel, or other material).

Section 1751 is configured to engage with a filling head or dispensing head, allowing fluid (e.g., a liquid phase of the fluid) to enter or leave the inner volume of the bottle. Section 1751 includes a valve seat against which valve member 1769 is configured seal and unseal. Valve member 1769 may be similar to, or different from, valve pin 1766. In some embodiments, when valve 1700 is engaged to a filling head, for example, a filling nozzle may engage with valve member 1769, pushing it axially downwards, as illustrated, thus causing valve member 1769 to unseal from the valve seat of section 1751. In some embodiments, when valve 1700 is engaged to a filling head, for example, pressure of fluid in a filling nozzle may push valve member 1769 axially downwards, as illustrated, thus causing valve member 1769 to unseal from the valve seat of section 1751. This unsealing allows the fluid to flow from the filling head between valve member 1769 and the valve seat to the volume between valve member 1769 and valve pin 1766. If float mechanism 1760 is the open configuration (e.g., no appreciable buoyant forces acting by liquid in the bottle onto float 1761), the fluid may then flow past valve pin 1766 and valve seat 1767 into the inner volume of the bottle. Spring 1768 is in compression, applying axial force on valve member 1769 to seal it against the valve seat of section 1751. Spring 1768 may be compressed by a filling nozzle, pressure from the fluid in the fill head, or both, to allow valve member 1769 to unseal from the valve seat of section 1751 and allow fluid to flow in or out of the bottle.

Section 1753 and float mechanism 1760 are configured to interface to the bottle and its inner volume thereof. Float mechanism 1760, as illustrated, is integrated as part of valve 1700. Accordingly, float mechanism 1760 is preferably sufficiently compact to fit into the bottle from the axial end. Float mechanism 1760 includes float 1761 configured to move in the axial direction along structural member 1762. Float 1761 is affixed to linkage 1763 such that both move axially substantially together. Float 1761 has a density (e.g., total mass per total volume) less than that of the liquid phase of the fluid in the bottle, such that buoyant forces from the liquid act on float 1761. For example, as illustrated, linkage 1763 may have slight off-axis motion but primarily translates along the axial direction. Linkage 1763 is affixed to linkage 1764, which is constrained about hinge 1765. Linkage 1764 also engages with valve pin 1766, sealing and unsealing valve pin 1766 against valve seat 1767. Although illustrated as a pin valve, any suitable valve geometry may be used in accordance with present disclosure. Accordingly, the mechanism including float 1761, linkage 1763, linkage 1764, and hinge 1765 may be modified in any suitable way or be replaced by any suitable mechanism coupling float 1761 to a valve member (e.g., valve pin 1766 in the illustrated example). In some embodiments, a retainer is included to limit travel of valve pin 1766 (e.g., similar to retainer 670 and valve pin 666 of FIG. 6).

Valve 1700 includes recesses 1772, which are configured to engage with bottle grippers or other suitable mechanisms for positioning a bottle assembly of which valve 1700 is part of (e.g., an assembly including valve 1700 affixed to a bottle). As illustrated, recesses 1772 may include “flats” for installation (e.g., wrench flats for tightening valve 1700 onto a bottle via threads of section 1753), positioning (e.g., flats for a bottle gripper to engage and apply axial, radial, and/or azimuthal force), or both. In an illustrative example, recesses 1772 may be formed by machining a flat into the otherwise nominally cylindrical outer surface of section 1752. As illustrated, recesses 1772 are arranged 90 degrees to relief port 1780, although any suitable orientation of recesses may be used. In a further example, a valve may include any suitable number of recesses (e.g., one, two, or more than two recesses).

Figure 22:
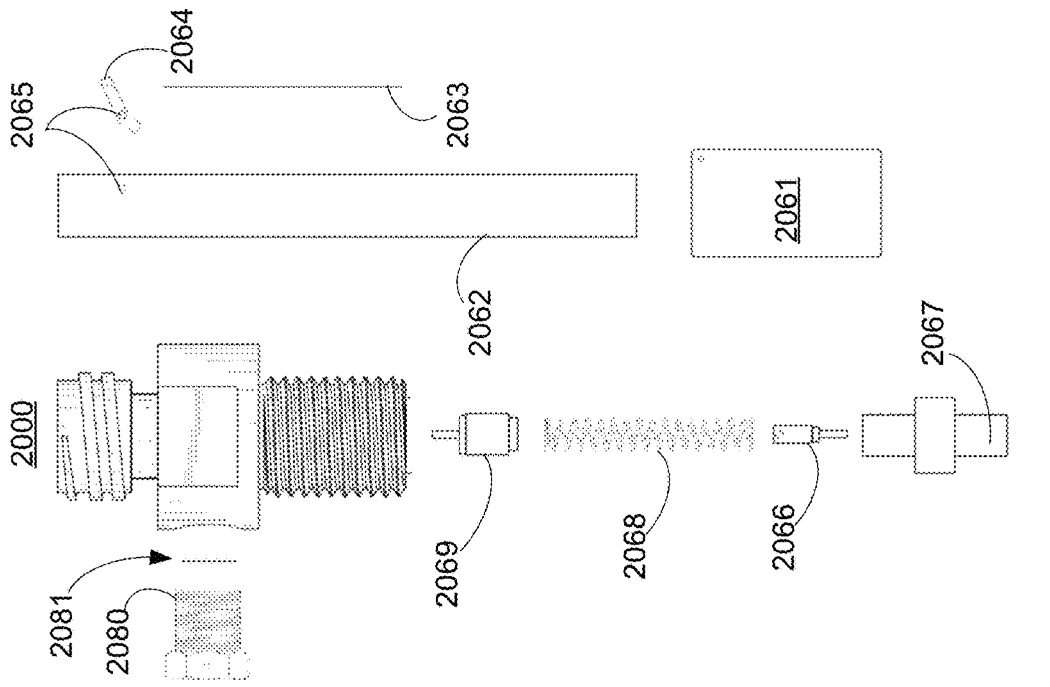
FIG. 22 shows a side exploded view of the illustrative valve of FIG. 20, in accordance with some embodiments of the present disclosure.
Figure 21:
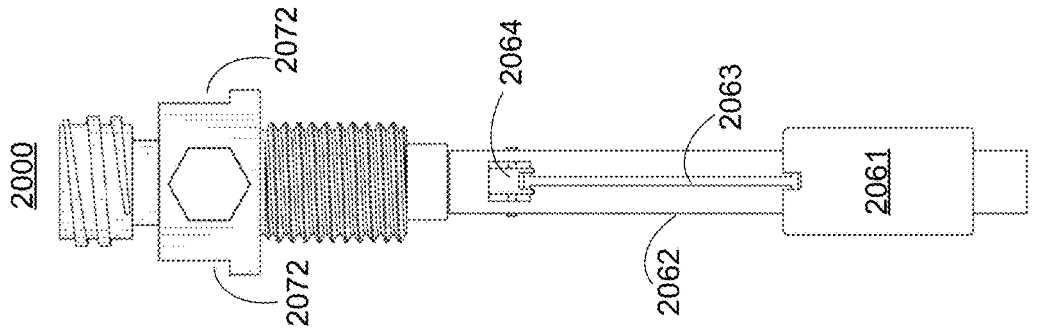
FIG. 21 shows a front view of the illustrative valve of FIG. 20, in an open position, in accordance with some embodiments of the present disclosure.
Figure 20:
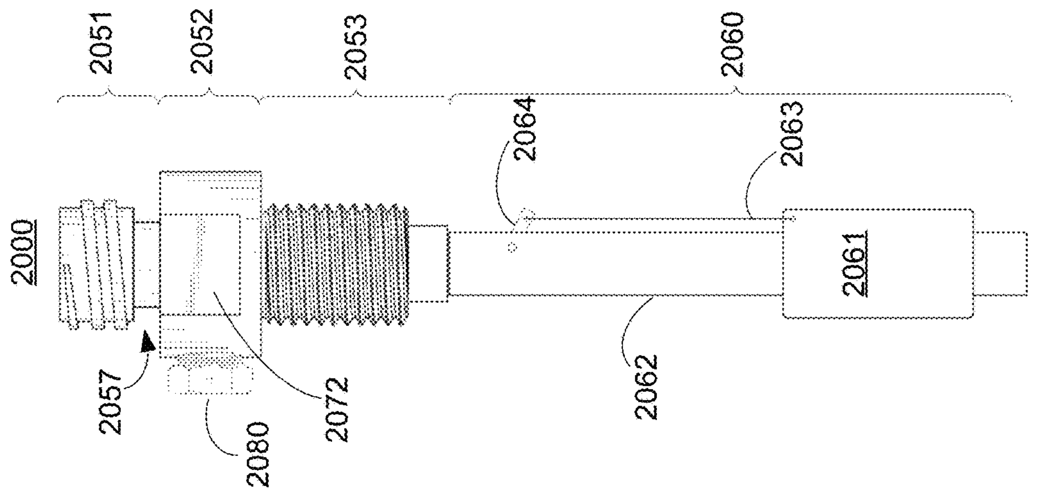
FIG. 20 shows a side view of an illustrative valve having a groove and a float mechanism, in accordance with some embodiments of the present disclosure.

FIG. 20 shows a side view of illustrative valve 2000 having groove 2057 and float mechanism 2060, in accordance with some embodiments of the present disclosure. FIG. 21 shows a front view of illustrative valve 2000 of FIG. 20, in an open position, in accordance with some embodiments of the present disclosure. FIG. 22 shows a side exploded view of illustrative valve 2000 of FIG. 20, in accordance with some embodiments of the present disclosure. Valve 2000 includes a valve body (e.g., sections 2051, 2052, and 2053), a first valve mechanism (e.g., valve pin 2066 shown in FIG. 22), a second valve mechanism (e.g., valve member 2069 shown in FIG. 22), groove 2057, flats 2072, float mechanism 2060, and relief valve 2080.

As illustrated, valve 2000 is configured to be engaged with a bottle (not shown) via threaded section 2053 (e.g., valve 1700 has external threads in threaded section 2053). Section 2052, as illustrated, interfaces with an axial end of the bottle (e.g., optionally with a seal, gasket or O-ring). Relief valve 2080 is engaged with a corresponding port of section 2052, to secure burst disk 2081. For example, relief valve 2080 may include external pipe threads (e.g., male NPT) which may engage with a female pipe thread of section 2052. In a further example, relief valve 2080 may engage with section 2052 by a straight thread interface with a radially-sealing or axially-sealing O-ring. In a further example, burst disk 2081 may have an associated burst pressure (e.g., 3000 psi or 206.8 bar in some embodiments), and may be held in place by relief valve 2080 being screwed into threads of section 2052. Section 2051, as illustrated, includes external threads configured for engaging a filling head (e.g., of a filling station), a dispensing head (e.g., of a consumer beverage device), or both. Section 2051 includes groove 2057 that extends azimuthally around valve 2000. For example, groove 2057 may have an outer diameter less than a minor diameter of the threads of section 2051. In an illustrative example, sections 2051, 2052, and 2053 of valve 2000 may be made primarily of brass. Structural portions and threads of valve 2000 may be brass.

Section 2051 is configured to engage with a filling head or dispensing head, allowing fluid to enter or leave the inner volume of the bottle. Section 2051 includes a valve seat against which valve member 2069 is configured seal and unseal. Valve member 2069 may be similar to, or different from, valve pin 2066. In some embodiments, when valve 2000 is engaged to a filling head, for example, a filling nozzle may engage with valve member 2069, pushing is axially downwards, as illustrated, thus causing valve member 2069 to unseal from the valve seat of section 2051. In some embodiments, when valve 2000 is engaged to a filling head, for example, pressure of fluid in a filling nozzle may push valve member 2069 axially downwards, as illustrated, thus causing valve member 2069 to unseal from the valve seat of section 2051. This unsealing allows the fluid to flow from the filling head between valve member 2069 and the valve seat to the volume between valve member 2069 and valve pin 2066. If float mechanism 2060 is the open configuration (e.g., no appreciable buoyant forces acting by liquid in the bottle onto float 2061), the fluid may then flow past valve pin 2066 and valve seat 2067 into the inner volume of the bottle. Spring 2068 is in compression, applying axial force on valve member 2069 to seal it against the valve seat of section 2051. Spring 1768 may be compressed by a filling nozzle, pressure from the fluid in the fill head, or both, to allow valve member 2069 to unseal from the valve seat of section 2051 and allow fluid to flow in or out of the bottle.

Section 2053 and float mechanism 2060 are configured to interface to the bottle and its inner volume thereof. Float mechanism 2060, as illustrated, is integrated as part of valve 2000. Accordingly, float mechanism 2060 is preferably sufficiently compact to fit into the bottle from the axial end. Float mechanism 2060 includes float 2061 configured to move in the axial direction along structural member 2062. Float 2061 is affixed to linkage 2063 such that both move axially substantially together. Float 2061 has a density (e.g., total mass per total volume) less than that of the liquid phase of the fluid in the bottle, such that buoyant forces from the liquid act on float 2061. For example, as illustrated, linkage 2063 may have slight off-axis motion but primarily translates along the axial direction. Linkage 2063 is affixed to linkage 2064, which is constrained about hinge 2065. Linkage 2064 also engages with valve pin 2066, sealing and unsealing valve pin 2066 against valve seat 2067. Although illustrated as a pin valve, any suitable valve geometry may be used in accordance with present disclosure. Accordingly, the mechanism including float 2061, linkage 2063, linkage 2064, and hinge 2065 may be modified in any suitable way or be replaced by any suitable mechanism coupling float 2061 to a valve member (e.g., valve pin 2066 in the illustrated example). In some embodiments, a retainer is included to limit travel of valve pin 2066 (e.g., similar to retainer 670 and valve pin 666 of FIG. 6).

Valve 2000 includes groove 2057, which is configured to engage with bottle grippers or other suitable mechanisms for positioning a bottle assembly of which valve 2000 is part of (e.g., an assembly including valve 2000 affixed to a bottle). As illustrated, groove 2057 includes a nominally rectangular cross section and extends fully azimuthally around section 2051. In an illustrative example, groove 2057 may be formed by applying a lathe to the outer surface of section 2051. In a further example, a valve may include any suitable number of grooves (e.g., one, two, or more than two grooves), any other suitable features for engaging with a device, or any combination thereof.

Valve 2000 includes flats 2072, which are configured to provide surfaces for engagement. As illustrated, flats 2072 may be used for installation (e.g., wrench flats for tightening valve 2000 onto a bottle via threads of section 2053), positioning (e.g., flats for a bottle gripper to reference, or engage and apply axial, radial, and/or azimuthal force), or both. In an illustrative example, flats 2072 may be formed by machining flats into the otherwise nominally cylindrical outer surface of section 2052. As illustrated, flats 2072 are arranged 90 degrees to relief port 2080, although any suitable orientation of recesses may be used. In a further example, a valve may include any suitable number of flats (e.g., one, two, or more than two flats). To illustrate, section 2052 may be hexagonal, having six flats, one of which may include features (e.g., a threaded hole) to accommodate relief port 2080.

Valves 650, 1250, 1700, and 2000 may include similar components although some features are unique to each design. Any of the features or aspects of valves 650, 1250, 1700, and 2000 may be combined with one another, omitted, or otherwise modified from the illustrations of FIGS. 6-22. For example, a valve may include a lip, a groove, a recess, any other suitable features, or any combination thereof. A bottle may include a mouth (e.g., having internal threads configured to engage with threads of a valve assembly). The mouth may have a corresponding diameter and may transition to a neck of the bottle. In some embodiments, when a valve assembly is installed on a bottle to create a bottle assembly, any portion of the valve assembly that is arranged below the mouth (e.g., within the bottle) must be able to pass through the mouth of the bottle. For example, if the mouth has an inner diameter D, then the portion of the valve assembly residing in the bottle must fit within diameter D (e.g., even if the diameter of the rest of the bottle is larger). While the valve assembly may, but need not, include a cylindrical footprint, the portion of the valve assembly residing in the bottle must be installable through the mouth of the bottle.

Figure 23:
FIG. 23 shows a flowchart of an illustrative process for managing filling of a fluid container, in accordance with some embodiments of the present disclosure.

FIG. 23 shows a flowchart of illustrative process 2300 for managing filling of a fluid container, in accordance with some embodiments of the present disclosure. Process 2300 may be performed by control circuitry such as, for example, control circuitry 111 of FIG. 1, control circuitry 220 of FIGS. 2-4, control circuitry 520 of FIG. 5, any other suitable control circuitry, or any combination thereof.

Step 2302 includes control circuitry receiving a user indication. In some embodiments, an indication is received from a user to a touchscreen or other suitable user interface. For example, a user may select a displayed "Fill Container" option on the touchscreen by pressing the corresponding area of the touchscreen. In a further example, a user may press a "Fill Container" mechanical button that is coupled to a switch that is electrically coupled to the control circuitry. In some embodiments, a user may provide the indication to an app installed on a user device such as a smart phone. The smart phone may communicate the indication to the control circuitry (e.g., via a wireless network).

Step 2304 includes control circuitry determining fluid container information. If a user has placed a fluid container in the fill interface of the filling station, control circuitry may determine fluid container information. Fluid container information may include, for example, a serial number, a capacity (e.g., in volume), a limit (e.g., a maximum or minimum pressure, a maximum or minimum temperature), a tare weight, a filling history of the bottle, a position of the bottle, any other suitable information, or any combination thereof. For example, the fluid container may include an identification tag that includes information such as the serial number, capacity, limits, and tare weight. In a further example, the filling interface may include a stage having a scale, and the control circuitry may determine an initial weight of the bottle based on a signal from the scale. In a further example, the filling interface may include a position sensor coupled to the control circuitry and configured to sense position information of the fluid container (e.g., a height, radial position, or azimuthal orientation of the bottle). Fluid container information may include any suitable information about a fluid container (e.g., a bottle, a valve affixed to a bottle, a bottle assembly, or any combination thereof).

In an illustrative example, step 2304 includes the control circuitry interacting with a RFID tag affixed to the fluid container. For example, the control circuitry may include, or be coupled to, a RFID reader/writer used to control access to use the filling station. In some embodiments, the RFID reader/writer confirms that the fluid container placed in the machine is valid and then allows the filling station to proceed to filling (e.g., information of the tag is used in filling station operation). In some embodiments, each fluid container includes an RFID tag on it affixed in a suitable way, so that the tag is not removable and is tamper resistant. In some embodiments, the RFID tag includes a tamper-evident RFID label. For example, if a label is removed, it breaks the antenna's connection with the chip and the device thus no longer functions (e.g., identification information is not communicated to the control circuitry). This prevents the tag from being used on another item. In some embodiments, the control circuitry is configured to alert a user or monitoring facility that a tag has either been tampered with or damaged.

Step 2306 includes control circuitry determining fluid system information. In some embodiments, fluid system information includes information about the stored fluid itself (e.g., thermodynamic state), components of the fluid system (e.g., pumps, valves, filling head, supply tank, sensors), environmental information (e.g., enclosure temperature or gaseous concentrations), or other information about the fluid system. Fluid system information may include, for example, a fluid temperature, a fluid pressure, a fluid amount (e.g., a liquid level of the fluid), status information of components (e.g., faulted or operational), enclosure temperatures, component temperatures, fluid concentrations in the enclosure (e.g., gas/vapor concentration), any other suitable information about any suitable aspect of the fluid system, or any combination thereof.

Step 2308 includes control circuitry causing a filling head to engage with the fluid container. In some embodiments, the control circuitry causes one or more actuators to actuate a stage, the filling head, or both, to engage to the filling head to the fluid container. For example, the fluid container may be secured by a gripping mechanism (e.g., a bottle gripper), and the gripping mechanism may move the fluid container into contact with the filling head (e.g., a valve member of the fluid container engages a filling nozzle of the filling head). In a further example, the fluid container may be secured by a gripping mechanism (e.g., a bottle gripper), and the filling head may move towards the fluid container until it engages the fluid container (e.g., a valve member of the fluid container engages a filling nozzle of the filling head). In some embodiments, the control circuitry may activate a locking mechanism or latching mechanism to secure the filling head to the fluid container. For example, the fluid container may include a recess, a groove, a lip, any other suitable feature, or any combination thereof, which may be engaged by a locking mechanism. In some embodiments, a locking or latching mechanism acts on the gripping mechanism to prevent motion of the gripping mechanism and the securely gripped fluid container.

Step 2310 includes control circuitry causing a filling head to provide fluid to the fluid container. In some embodiments, step 2310 includes, for example, causing a pump to start pumping, causing a valve to be opened, determining a fluid flow rate (e.g., an amount of fluid per time), determining an amount of fluid (e.g., an integrated fluid flow rate during a time period), monitoring a pressure (e.g., from a pressure sensor exposed to the fluid), monitoring a temperature (e.g., from a temperature sensor exposed to the fluid, a component, the environment, the enclosure, or a combination thereof), monitoring a concentration (e.g., of the fluid in gas phase in the local environment), or any combination thereof. In some embodiments, for example, the control circuitry may execute a predetermined fill process that includes opening valves, turning a pump on, and monitoring pressure until the fluid pressure provides an indication to stop filling (e.g., a float mechanism of the fluid container has closed a valve of the fluid container). For example, the fill process may proceed until the fluid pressure exhibits a feature such as a peak, a step, a value exceeding a threshold, a rate of change, any other suitable feature, or any combination thereof. In some embodiments, for example, filling occurs with a fluid pressure of between 838 to 1238 psi (57.8-85.3 bar). In some embodiments, for example, filling occurs with a fluid pressure of more than 1238 psi (e.g., 1500 psi). For example, filling may continue until a pressure transducer/switch detects a rapid and constant increase in pressure above the normal filling pressure range. In some embodiments, step 2310 includes activating a sterilization system (e.g., ultraviolet-based light, or a spray disinfectant) integrated into the filling head to sterilize the fluid container prior to filling.

Step 2312 includes control circuitry identifying a stop condition. A stop condition may include, for example, a fluid pressure reaching a threshold, a time limit, a measured fluid container weight, an amount of fluid provided to the fluid container, a fault condition, any other suitable criterion, or any combination thereof. For example, the control circuitry may monitor a signal from a pressure transducer (e.g., pressure transducer 212 of FIGS. 2A-2C), or value derived thereof, and if it exceeds a threshold, the control circuitry may determine that a float mechanism has closed a valve of the fluid container. Closing of the valve may cause the pump to "dead head", and the fluid pressure of the fluid may rise upstream of the filling head (e.g., the local static pressure may increase and then decrease as a pressure wave passes through the fluid). In a further example, the control circuitry may monitor a flow rate of the fluid, numerically integrating the flow rate over time, until a predetermined amount of fluid (e.g., a volume of fluid, a mass of fluid) has been supplied to the fluid container, using the amount of fluid as the stop condition. In a further example, the control circuitry may monitor a weight of the fluid container and the weight meeting or exceeding a threshold is the stop condition (e.g., enough mass of liquid phase fluid has been added to the fluid container to reach a predetermined weight). In some embodiments, the control circuitry may identify one or more faults as a stop condition. For example, the control circuitry may determine that a component (e.g., a tank, pump, valve, sensor, nozzle, or other component) has failed, a communication failure occurred, any other suitable fault has occurred, or any combination thereof.

Step 2314 includes control circuitry causing isolation of a fluid supply from the fluid container. In some embodiments, the control circuitry causes the pump to stop pumping fluid, one or more valves to close, or both. In some embodiments, the control circuitry causes the filling head to disengage from the fluid container (e.g., after one or more valves has been closed to prevent or otherwise avoid leakage).

In an illustrative example, referencing a bottle mechanism having a float mechanism, the control circuitry may be configured determine an amount of fluid provided to the fluid container. In some embodiments, the float valve is expected to be relatively accurate and repeatable, thus ensuring that a repeatable fluid level in a fluid container is achieved during filling. In some instances, however, the float mechanism may fail to close or may close later than desired (e.g., too much fluid is supplied). In some embodiments, the control circuitry is configured to check that the float mechanism closed a valve as expected. In some embodiments, the control circuitry is configured to determine when the valve is getting close to closing fully. In some embodiments, a flow meter is used to monitor filling and verify when the fluid container is filled (e.g., an amount of fluid has been supplied). For example, the control circuitry may be configured to determine a volume capacity of the fluid container and the starting volume of fluid (e.g., before filling). In a further example, the control circuitry may be configured to monitor the flow meter to identify when the float is about to close (e.g., flow rate reduces, or the fluid container capacity is almost reached). In response, the control circuitry may cause the transfer pump to slow down or stop pumping, a valve to close, or both. In a further example, the control circuitry may be configured to identify a malfunction of the float or otherwise troubleshoot the system and, in response, shut down the pump (e.g., if a flow meter indicates that the amount of fluid delivered exceeds a threshold). In some embodiments, the control circuitry is configured to determine the final weight (e.g., after filling) and accordingly adjust future flow rate calculations if the calculation is determined to be wrong. In some embodiments, a flow meter, a weight scale, or both, are used to verify operation of the float mechanism and help ensure the delivery of an accurate amount of fluid to the fluid container.

Figure 24:
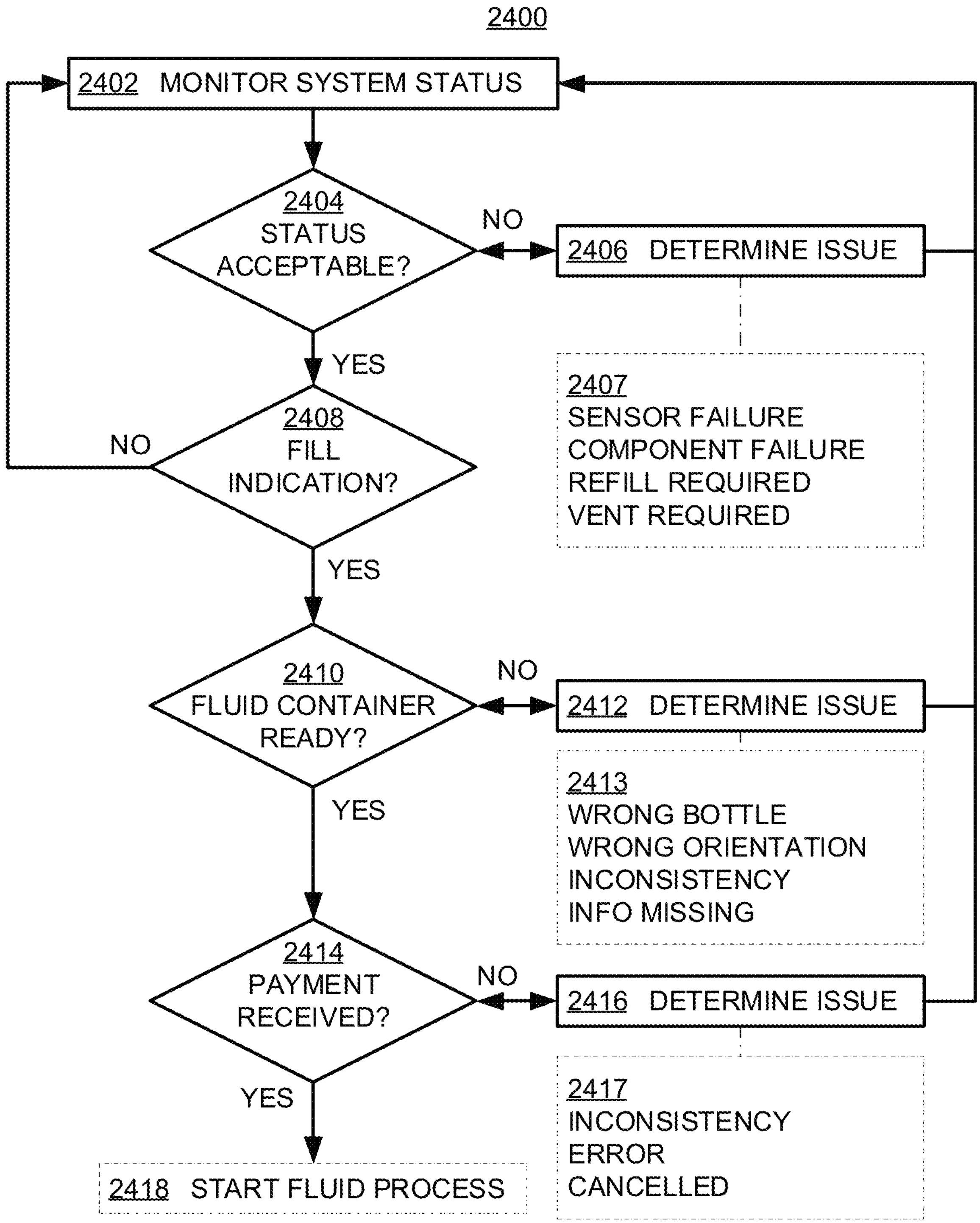
FIG. 24 shows a flowchart of an illustrative process for determining whether to fill a fluid container, in accordance with some embodiments of the present disclosure.

FIG. 24 shows a flowchart of illustrative process 2400 for determining whether to fill a fluid container, in accordance with some embodiments of the present disclosure. Process 2400 may be performed by control circuitry such as, for example, control circuitry 111 of FIG. 1, control circuitry 220 of FIGS. 2-4, control circuitry 520 of FIG. 5, any other suitable control circuitry, or any combination thereof.

Step 2402 includes control circuitry monitoring a status of a fluid management system, or aspect thereof. A status may include an operational check (e.g., a component is functional or faulted), a recent value of an operating parameter (e.g., fluid level, temperature, or pressure, an environmental temperature, a number of stored bottles, a number of fills remaining), a set of indications received (e.g., fill indications, payment information, bottle information), state of a network entity (e.g., database online/offline, connection to a cellular network, connection to the internet), an operating mode (e.g., standby, filling, refilling, starting, stopping, faulted), any other suitable indicator of a state of the system, or any combination thereof. In some embodiments, the control circuitry may store one or more flag values, mode identifiers, or other state information indicating whether the system is ready for filling. For example, if a pump, valve, or mechanism (e.g., a stage, gripper, or filling head mechanism) is non-operational, then the control circuitry may determine that the system status is "non-operational." In a further example, if all subsystems and components are operational, and a sufficient amount of fluid is stored in a supply tank, then the control circuitry may determine the system status is "ready" or "operational."

In some embodiments, the control circuitry performs step 2402 on a predetermined schedule (e.g., always monitoring at some sample rate). In some embodiments, the control circuitry performs step 2402 in response to a receiving a fill indication (e.g., step 2402 follows step 2408), in response to a fluid container being ready (e.g., step 2402 follows step 2410), or in response to payment being received (e.g., step 2402 follows step 2414).

Step 2404 includes control circuitry determining whether a status is acceptable or unacceptable. Based on the system status of step 2402, the control circuitry may determine whether the status is acceptable for operation or unacceptable for operation. If the system status is acceptable, the control circuitry may proceed to step 2408. If the system status is unacceptable, the control may proceed to step 2406 to determine the issue. For example, the control circuitry may determine that the system status is unacceptable based on a sensor failure, a component failure, a liquid level (e.g., a refill of the supply tank is required), enclosure venting is required (e.g., too much gas-phase fluid is present outside of the plumbing), a leak is detected, any other issue that may impact system readiness or safety, or any combination thereof.

Step 2406 includes control circuitry determining an issue associated with the status being unacceptable, as determined at step 2404. In some embodiments, the control circuitry may identify a flag value, identify a component or failure mode thereof, identify a likely failure based on an unacceptable operating parameter, alert a repair service, alert a refilling service, or otherwise determine why the system status is unacceptable. In some embodiments, for example, the control circuitry may access a database of troubleshooting codes to identify a likely failure based on the system status information.

Step 2408 includes control circuitry determining whether a fill indication has been received. In some embodiments, the control circuitry receives the fill indication at a user interface. For example, a user may interact with a touchscreen, touchpad, keypad, one or more buttons, or other features of the user interface to indicate that filling a fluid container is desired. In some embodiments, the control circuitry may determine that a fill indication is received when a bottle is detected at the filling interface. During times when no fill indication is received, the control circuitry may perform any or all of steps 2402-2406 but need not actively perform any steps.

Step 2410 includes control circuitry determining whether a fluid container is ready for filling. In some embodiments, the control circuitry determines the fluid container is ready by determining identification information of the fluid container, position information of the fluid container, state information of the fluid container, a user confirmation that the fluid container is ready for filling, any other suitable information, or any combination thereof. For example, the control circuitry may identify a fluid container's serial number from an identification tag. In a further example, the control circuitry may determine a radial position, and axial position (e.g., a height), an azimuthal orientation (e.g., if an identification tag is facing a read-accessible direction), or a combination thereof of a fluid container and accordingly determine if the current position of the fluid container is acceptable to proceed with a filling process (e.g., step 2418).

Step 2412 includes control circuitry determining an issue associated with a fluid container not being ready for filling. If the control circuitry determines that a fluid container is not present at the filling interface (e.g., but a fill indication was received), a position of a fluid container is not acceptable for filling (e.g., for gripping the fluid container or reading an identification tag), the fluid container is already filled (e.g., based on a weight measurement), the fluid container is not compatible with the filling head, no fluid container information is available, inconsistent information (e.g., a bottle tare weight and measured weight do not match, user information does not match the fluid container serial number), that the fluid container is not ready for filling based on any other suitable criterion, or based on any combination thereof.

Step 2414 includes control circuitry determining whether payment has been received. In some embodiments, the control circuitry includes a payment processing module, to which the user makes payment for the filling service. Payment may include a fiat transaction (e.g., cash), a payment card (e.g., a debit card, credit card, gift card, or other payment card), payment using a smart phone application, entering payment information (e.g., account and routing numbers) into an interface (e.g., the user interface), any other suitable payment information, or any combination thereof. When payment has been received, the control circuitry may proceed to step 2418 to begin filling the fluid container. If payment is not received, then the control circuitry may proceed to step 2416. In some embodiments, a user may prepay credits to a user-linked account (e.g., using a smartphone or other user device). The control circuitry may receive prepayment information, or may extract prepayment information from the user account (e.g., associated with an identification tag of a bottle).

Step 2416 includes control circuitry determining an issue associated with a payment not being received. For example, the control circuitry may determine that there are insufficient funds to complete the filling transaction, payment information is incorrect or inconsistent, payment information is incomplete, the user has cancelled the payment or transaction, an error has occurred (e.g., a communication error with a financial institution over the internet), any other reason payment is not complete, or any combination thereof. In response, the control circuitry may prompt the user to re-enter payment information, restart process 2400 (e.g., exit the current transaction), or otherwise return to an earlier process step. If payment is received after step 2416, the control circuitry may proceed to step 2418 (e.g., by return into step 2414 or directly to step 2418).

Figure 25:
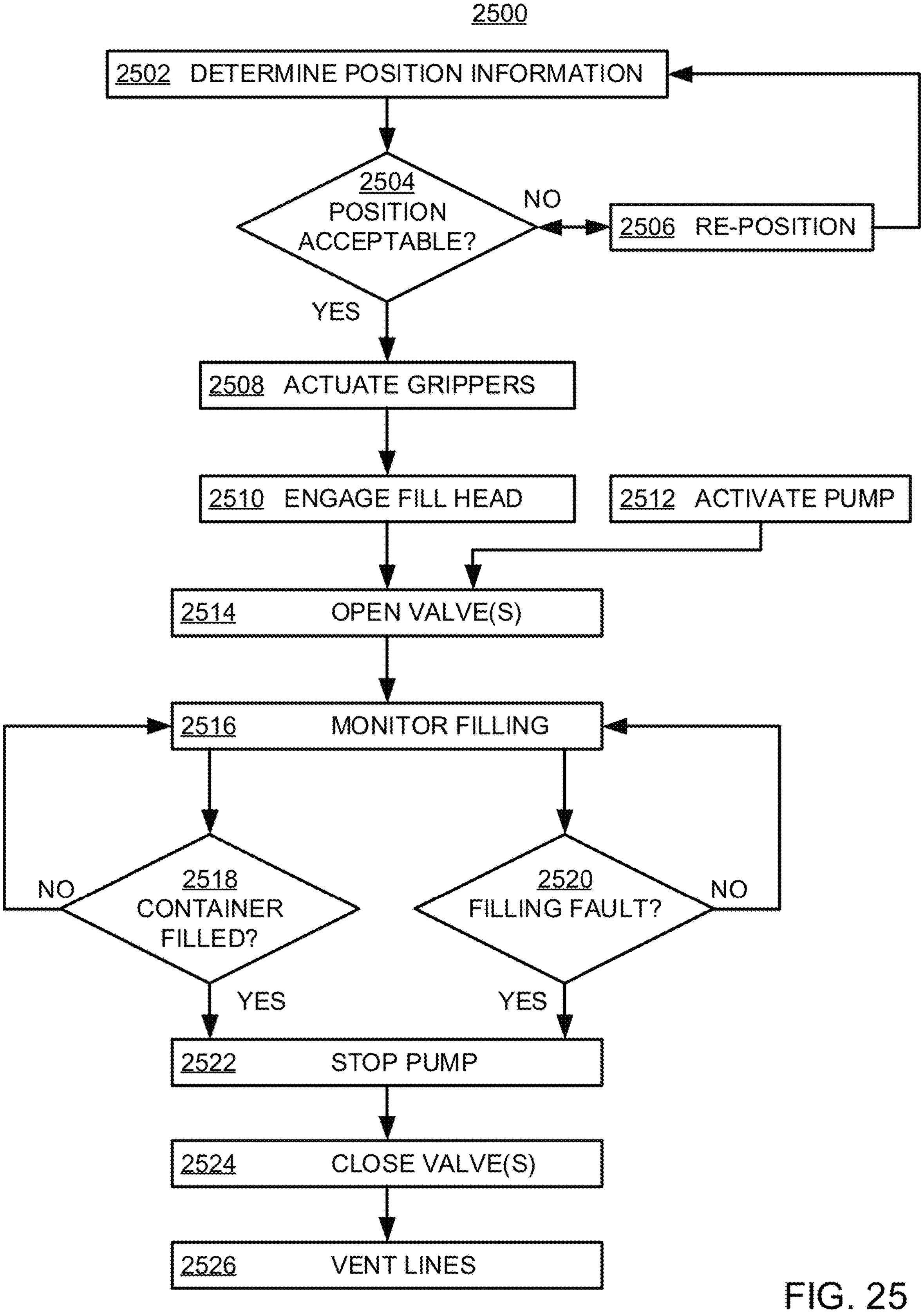
FIG. 25 shows a flowchart of an illustrative process for filling a fluid container, in accordance with some embodiments of the present disclosure.

Step 2418 includes control circuitry starting a fluid process, described in the context of process 2500 of FIG. 25, for example. FIG. 25 shows a flowchart of illustrative process 2500 for filling a fluid container, in accordance with some embodiments of the present disclosure. Process 2500 may be performed by control circuitry such as, for example, control circuitry 111 of FIG. 1, control circuitry 220 of FIGS. 2-4, control circuitry 520 of FIG. 5, any other suitable control circuitry, or any combination thereof.

Step 2502 includes control circuitry determining position information about a fluid container. Position information may include a radial position, an axial position (e.g., a height), an azimuthal orientation, or any combination thereof. Note that cylindrical coordinates are used for clarity, but any suitable coordinate system having three suitable spatial coordinates may be used to describe the position of a fluid container (e.g., Cartesian coordinates, spherical coordinates). In some embodiments, the fill interface may be configured so that a fluid container can only be positioned in a few, or only one, positions. In some embodiments, the control circuitry may determine a height of the top of the fluid container (e.g., the top of a valve of the fluid container) based on optical techniques (e.g., a line of sight measurement, a scanning measurement, or an image processing technique). Determining position information may help prevent or reduce the likelihood of damaging the fluid container or fill head (e.g., from mechanical interference), leakage (e.g., if a fill nozzle on valve do not align), unrepeatable operation (e.g., fluid containers positioned differently), achieving an unsafe condition (e.g., large pressures, large mechanical stresses, unstable engagement of components), any other undesired occurrences, or any combination thereof.

Step 2504 includes the control circuitry determining whether the position information is acceptable for filling. If the control circuitry determines that the position information is acceptable for filling the fluid container, the control circuitry may proceed to step 2508. If the control circuitry determines that the position information is unacceptable for filling the fluid container, or cannot determine sufficient position information, the control circuitry may proceed to step 2506.

Step 2506 includes the control circuitry causing re-positioning the fluid container. In some embodiments, the control circuitry may actuate a gripper to secure the fluid container and adjust the position until it is acceptable. For example, a bottle gripper may be actuated to grip a bottle and rotate it to a desired orientation or translate the bottle to a desired radial position. In some embodiments, the control circuitry may prompt the user to re-position the fluid container. For example, the control circuitry may provide an image or reference marker that the user may consult to re-position the bottle. When re-positioning is complete, the control circuitry may repeat step 2502 or proceed to step 2508 (e.g., by optionally repeating step 2504).

Step 2508 includes the control circuitry actuating grippers to secure the fluid container. In some embodiments, the control circuitry may actuate the grippers by applying electrical power, pneumatic power, hydraulic power, or any other suitable power source to cause the grippers to secure the fluid container. For example, the gripper may include a screw mechanism configured to clamp the grippers onto a bottle, and the control circuitry may actuate a motor that turns the screw and tightens the grippers onto the bottle. In some embodiments, the fill interface secures the fluid container and step 2508 may be omitted. For example, the fill interface may include a stage having a cylindrical recess configured to accept the fluid container. The recess may include features such as rubber strips or spring-loaded members that maintain the position of the fluid container.

Step 2510 includes the control circuitry causing the fluid container to engage a fill head. In some embodiments, the control circuitry may cause the grippers, a stage, or both to move near to a fill head and engage the fill head. In some embodiments, the control circuitry may cause the fill head to move to the secured fluid container and engage the fluid container. In some embodiments, the control circuitry may cause both the grippers and the fill head to move to each other. For example, the control circuitry may cause the fill head to move axially, the gripper to move radially and azimuthally to cause the engagement. Engaging the fill head may include causing a valve to open (e.g., valve member 669 unsealing from a valve seat of section 651, as shown in FIG. 7).

Step 2512 includes the control circuitry activating a pump. In some embodiments, for which the pump is an electric pump, the control circuitry may cause a contactor, relay, or switch to close and allow electric current to flow. Activating the pump may cause the fluid pressure in the fluid conduit (e.g., the "line") to rise. In some embodiments, for which the pump is gas driven, the control circuitry may open a valve (e.g., as shown by system 500 of FIG. 5), or activate a compressor (e.g., as shown by system 200 of FIGS. 2A-2C) to provide gas pressure for driving the pump to pump the fluid (e.g., a liquid phase of the fluid).

Step 2514 includes control circuitry causing one or more valves to open. In some embodiments, the control circuitry causes the one or more valves (e.g., valves 205 and 211 of system 200 of FIGS. 2A-2C) to open and allow fluid to flow. In some embodiments, the control circuitry may apply electric voltage to a relay, switch, or other suitable electrical device to cause electric current to flow and actuate the valves. For example, the control circuitry may cause electric power to be applied to a solenoid valve to open the valve.

Step 2516 includes control circuitry monitoring the filling process. When the pump is on, and the one or more valve are open, fluid may flow to the fluid container from the supply tank based on the pressure field, thus increasing the amount of fluid in the fluid container. The control circuitry may monitor a flow rate (e.g., based on a signal from a flow meter), an accumulated amount of fluid (e.g., based on fluid container weight, and/or a totalized flow signal), a fluid pressure (e.g., based on a signal from a pressure transducer), a fluid temperature (e.g., based on a temperature sensor in thermal contact with the fluid), an environmental sensor (e.g., to detect environmental temperature or fluid concentration), a system status (e.g., component operational status, one or more flag values, fault information), any other suitable operating parameter or operating information, or any combination thereof.

Step 2518 includes control circuitry determining whether the fluid container is filled. If the control circuitry determines that the fluid container is not yet filled, or that it is not full, the control circuitry may cause the filling process to continue. In some embodiments, the control circuitry may determine the fill status based on a weight of the fluid container, an amount of fluid supplied to the fluid container (e.g., based on a turbine flow meter and batch totalizer), fluid pressure, any other operating parameter, or a combination thereof. For example, a fluid container may include a float mechanism configured to cause the fluid container to close to fluid flow, thus causing fluid pressure to increase upstream of the fill head. To illustrate, the fluid pressure increase may be sensed by a pressure sensor and the control circuitry may identify that the pressure has met or crossed a threshold, exhibits a spike, step, or other suitable feature indicative of a dead-headed line. While not filled (e.g., as predetermined by the user, the control circuitry or both), the control circuitry may continue to cause fluid flow and monitor the system. If the control circuitry determines the fluid container is full, the control circuitry may proceed to step 2522.

Step 2520 includes control circuitry determining whether a filling fault has occurred. The control circuitry may monitor for a component failure, sensor failure, disengagement of the fill head and fluid container, any other suitable fault conditions, or any combination thereof. While no fault is detected, the control circuitry may continue to cause fluid flow and monitor the system. If a fault is detected, the control circuitry may proceed to step 2522.

Step 2522 includes control circuitry causing the pump to stop pumping. Similar to step 2512 wherein the pump is activated, the control circuitry performs a suitable step for de-activating the pump. For example, in the context of an electric pump, the control circuitry may cause electric power to cease being applied to the pump (e.g., using a relay, contactor, or switch). In a further example, in the context of gas-driven pump, the control circuitry may cause gas pressure to cease being applied to the pump (e.g., using a valve or by de-activating a gas compressor).

Step 2524 includes control circuitry causing the one or more valves to close. In some embodiments, the control circuitry causes the one or more valves (e.g., valves 205 and 211 of system 200 of FIGS. 2-4) to close and prevent fluid from appreciably flowing (e.g., other than transient accumulation flows as pressure equilibrates). In some embodiments, the control circuitry may apply or cease to apply electric voltage to a relay, switch, or other suitable electrical device to cause electric current to cease to flow, thus de-actuating the one or more valves. For example, the control circuitry may cause electric power to cease to be applied to a solenoid valve to close the valve (e.g., a normally closed valve). In some embodiments, steps 2522 and 2524 are performed at the same time, wherein the pump is de-activated and one or more valves are closed simultaneously (e.g., or with a predetermined lead/lag from each other).

Step 2526 includes control circuitry causing the fluid lines to vent. In some embodiments, the control circuitry causes a valve (e.g., valve 213 of system 200 of FIGS. 2-4) to open and de-pressurize the lines. In some embodiments, the control circuitry may apply or cease to apply electric voltage to a relay, switch, or other suitable electrical device to cause electric current to cease to flow, thus actuating the valve for venting. For example, the control circuitry may cause electric power to be applied to a solenoid valve to open the valve (e.g., a normally closed valve) and vent fluid to the environment.

In an illustrative example, control circuitry may monitor a fluid management system. The control circuitry may receive signals from one or more sensors and check the status of key performance indicators, provide real-time feedback to another device or central monitoring station. In some embodiments, the control circuitry provides instantaneous feedback to a cloud-based computer device. For example, temperature, pressure, and infrared measurements may be provided as a readout of activity of the fluid management system. To illustrate, if any measurement is out of accepted bounds, the cloud-based device may make a change to the corresponding component, or operating mode thereof, or notify an agent that it requires service.

In an illustrative example, the control circuitry may control a temperature of the case or enclosure to keep it at a specified temperature or within a desired temperature range (e.g., optimal for filling of liquid $CO_2$). Liquid $CO_2$, for example, has properties that are sensitive to temperature (e.g., it may undergo a phase change if its thermodynamic state is near a phase boundary). Liquid $CO_2$ has a saturation line and a critical point. When pumping $CO_2$, if the liquid is subjected to lower pressure or higher temperatures this may cause the liquid to vaporize, thus impeding the pumping process (e.g., the pump is configured for liquid operation). Temperature control of the enclosure and fluid lines ensures the $CO_2$ remains in a liquid state throughout the pumping process. For example, when the temperature is relatively warmer, liquid $CO_2$ can vaporize from the liquid phase. In some embodiments, the control circuitry may monitor a fluid temperature and, if the temperature is acceptable (e.g., not sufficiently high to cause a phase change such as boiling), then the control circuitry may continue a filling process. For example, in the context of a liquid $CO_2$ system and corresponding filling processes, the $CO_2$ is desired to stay in liquid form (e.g., vapor bubbles may impact pumping or flow through small orifices). If the control circuitry determines that a fluid temperature is too high (e.g., liquid $CO_2$ could vaporize into a gas phase), the control circuitry may alert a service, cause a vent valve to open to vent over pressure, shut the system off, or a combination thereof. If the control circuitry determines that a fluid temperature is too low or too high (e.g., outside of a target operating range) then the control circuitry may adjust the filling process based on those conditions.

In an illustrative example, the control circuitry may determine that a fluid level is low (e.g., a liquid level in a supply tank or an amount of stored $CO_2$ is low) and in response sends a signal to a fluid-filling company, a central monitoring facility, or both, to have a filling entity come to the site and refill or replace the supply tank. In some embodiments, the control circuitry may determine a level of liquid phase fluid (e.g., liquid $CO_2$) in the supply tank by using a mechanical level gauge in the tank, an ultrasonic level sensor, a guided wave radar probe, an ultrasonic sensor outside the tank, metered calculations based on flow usage, a capacitive sensor, an optical system (e.g., a light source and detector, an image processing technique), any other suitable sensor, or any combination thereof.

In an illustrative example, the control circuitry may determine fluid container inventory (e.g., how many fluid containers are available for dispensing). When the number of stored fluid containers is running low (e.g., at or below a threshold value), the control circuitry may send a notification to a fluid-filling company, a central monitoring system, a fluid container supply company, or a combination thereof, to have a bottle supplier come to the site and replenish stock of fluid containers.

In some embodiments, a fluid management system is configured to dispense fluid containers (e.g., $CO_2$ Cylinders). In some embodiments, a fluid management system is configured to dispense syrup bottles (e.g., for making flavored beverages in a home carbonation device). In some embodiments, a fluid management system is configured to dispense $CO_2$ carbonation bottles. In some embodiments, a fluid management system is configured to apply shrink wrap onto a valve or bottle assembly after a filling process. In some embodiments, a fluid management system is configured to place a cap onto a valve of a bottle assembly after filling.

In some embodiments, a user device such as, for example, a smart phone may include a software application for interacting with a fluid management system. For example, in some embodiments, a user may use the app to pay or prepay for a refill of a fluid container. In a further example, the app may store filling history information (e.g., number of fillings, frequency of fillings, time between fillings, location of fillings), or access a database that stores filling history information via a wireless network. In some embodiments, a plurality of fluid management systems may be commissioned, in a plurality of respective locations (e.g., statewide or nationwide). In some embodiments, the app may include delivery routing software to coordinate fluid container pickups in real time. For example, if a fluid container is empty, a pickup service may place the fluid container location on their route. The driver picks up the fluid container, takes it central facility where it gets refilled by a fluid management system, and then puts the fluid container into the delivery cycle (e.g., for the next day to be returned to the user). To illustrate, this process allows the customer to get back their same fluid container (e.g., having the same serial number and a consistent filling history).

In some embodiments, a user may own the fluid container rather than rent or possess the fluid container. Accordingly, a user may refill the same fluid container repeatedly and the fluid container may be linked to a user account and is trackable (e.g., via a RFID tag or other identification tag). In some embodiments, a fluid container is not owned by the user and may be exchanged for another fluid container. For example, a user may submit an emptied fluid container and receive a different, filled container. The fluid management system would keep the empty container and refill it at a filling station and put it in inventory for the next exchange with another customer. In some such embodiments, fluid container management may be improved or eased (e.g., local inventory rather than transporting/distributing containers).

It is contemplated that the steps or descriptions of FIGS. 23-25 may be used with any other embodiment of this disclosure. In addition, the steps and descriptions described in relation to FIGS. 23-25 may be done in alternative orders or in parallel to further the purposes of this disclosure. For example, each of these steps may be performed in any order or in parallel or substantially simultaneously to increase the speed of the system or method. Any of these steps may also be skipped or omitted from the process. Furthermore, it should be noted that any of the devices or equipment discussed in relation to FIGS. 1-22 could be used to perform one or more of the steps in FIGS. 23-25. In addition, one or more steps of processes 2300, 2400, and 2500 may be incorporated into or combined with one or more steps of any other process or embodiment described herein.

The above-described embodiments of the present disclosure are presented for purposes of illustration and not of limitation, and the present disclosure is limited only by the claims that follow. Additionally, it should be noted that any of the devices or equipment discussed in relation to FIGS. 1-22 could be used to perform one or more of the suitable steps in processes 2300-2500 in FIGS. 23-25, respectively. Furthermore, it should be noted that the features and limitations described in any one embodiment may be applied to any other embodiment herein, and flowcharts or examples relating to one embodiment may be combined with any other embodiment in a suitable manner, done in different orders, performed with addition steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A carbonation device, comprising:
- a dispensing head;
- a gripper configured to:
  - engage a lip that interfaces with an axial end of a bottle that is configured to store carbon dioxide; and
  - move the bottle by providing a force on the lip; and
- a lever, wherein a single motion of the lever causes the gripper to move the bottle towards the dispensing head to engage the bottle in fluid connection with the dispensing head.

2. The carbonation device of claim 1, wherein:
- the axial end of the bottle comprises a cylindrical outer surface; and
- the gripper comprises a curved surface configured to accommodate the cylindrical outer surface.

3. The carbonation device of claim 1, wherein the single motion of the lever comprises a downward motion of the lever.

4. The carbonation device of claim 1, wherein the motion of the lever causes the gripper to move the bottle into fluid connection with the dispensing head and lock the bottle into place.

5. The carbonation device of claim 1, wherein the carbonation device comprises an in-home carbonation device configured to carbonate beverages.

6. The carbonation device of claim 1, wherein the lip comprises an outer diameter greater than an outer diameter of the neck.

7. The carbonation device of claim 1, wherein an o-ring is positioned at the interface between the lip and the axial end of the bottle.

8. The carbonation device of claim 1, wherein a valve assembly interfaces to the axial end of the bottle and comprises the lip.

9. A carbonation system, comprising:
- a fluid container configured to store carbon dioxide, wherein the fluid container comprises:
  - a bottle having a port arranged at an axial end; and
  - a valve assembly affixed to the bottle at the port, wherein the valve assembly comprises a lip configured to interface to the axial end of the bottle and extend radially from the axial end of the bottle; and
- a carbonation device, comprising:
  - a dispensing head; and
  - a lifting mechanism configured to:
    - receive the fluid container; and
    - provide a force on the lip to lift the fluid container towards the dispensing head to engage the fluid container in fluid connection with the dispensing head.

10. The carbonation system of claim 9, wherein the lifting mechanism comprises:
- a gripper configured to engage with the lip; and
- a lever configured to move the gripper to lift the fluid container towards the dispensing head to engage the fluid container in fluid connection with the dispensing head.

11. The carbonation system of claim 9, wherein the axial end of the bottle comprises a cylindrical outer surface and wherein the lifting mechanism comprises a curved surface to accommodate the cylindrical outer surface.

12. The carbonation system of claim 9, wherein the bottle comprises an inner volume capable of withstanding 1,800 psi of pressure.

13. The carbonation system of claim 9, wherein the valve assembly comprises:
- a first axial section having external threads for affixing the valve assembly to the bottle;
- a second axial section that comprises the lip; and
- a third axial section comprising a relief port.

14. The carbonation system of claim 13, wherein the axial end of the bottle comprises a cylindrical outer surface having a first outer diameter and wherein the lip comprises a cylindrical outer surface having a second outer diameter greater than the first outer diameter.

15. The carbonation system of claim 14, further comprising an o-ring positioned at the interface between the lip and the axial end of the bottle.

16. A method, comprising:

placing a fluid container into a beverage machine, wherein the fluid container comprises a lip that interfaces with an axial end of a bottle; and actuating a lever, which causes a gripper to provide force to the lip of the fluid container to move the fluid container into fluid connection with a filling head of the beverage machine.

17. The method of claim 16, further comprising locking the fluid container in fluid connection with the filling head of the beverage machine.

18. The method of claim 16, wherein actuating the lever comprises moving the lever down.

* * * * *